(12) United States Patent
Balandis et al.

(10) Patent No.: US 9,403,048 B2
(45) Date of Patent: Aug. 2, 2016

(54) MULTI FUNCTION EXERCISE APPARATUS WITH RESISTANCE MECHANISM

(71) Applicant: Balandis Taft Patents, LLC, Channelview, TX (US)

(72) Inventors: Adolph James Balandis, Houston, TX (US); Andrew A Taft, Channelview, TX (US)

(73) Assignee: Balandis Taft Patents, LLC, Houston, TX (US)

( * ) Notice: Subject to any disclaimer, the term of this patent is extended or adjusted under 35 U.S.C. 154(b) by 15 days.

(21) Appl. No.: 14/656,821

(22) Filed: Mar. 13, 2015

(65) Prior Publication Data

US 2015/0190667 A1    Jul. 9, 2015

Related U.S. Application Data

(62) Division of application No. 13/751,330, filed on Jan. 28, 2013, now Pat. No. 9,011,301.

(51) Int. Cl.
*A63B 21/005* (2006.01)
*A63B 24/00* (2006.01)
(Continued)

(52) U.S. Cl.
CPC ............ *A63B 21/005* (2013.01); *A63B 21/0051* (2013.01); *A63B 21/0052* (2013.01); *A63B 21/0056* (2013.01); *A63B 21/0057* (2013.01); *A63B 21/078* (2013.01); *A63B 21/0783* (2015.10); *A63B 21/169* (2015.10); *A63B 21/1672* (2015.10); *A63B 21/4047* (2015.10); *A63B 23/0355* (2013.01); *A63B 23/03525* (2013.01); *A63B 24/0087* (2013.01); *A63B 21/0023* (2013.01); *A63B 21/0058* (2013.01); *A63B 21/0085* (2013.01);

(Continued)

(58) Field of Classification Search
CPC ............... A63B 21/1492; A63B 21/05; A63B 21/0052; A63B 21/0056; A63B 21/0057; A63B 21/04; A63B 21/005; A63B 21/1465; A63B 21/1496; A63B 21/0058; A63B 2225/09; A63B 21/0081; A63B 21/0051; A63B 21/0023; A63B 21/0085; A63B 21/078; A63B 21/169; A63B 21/0783; A63B 21/4029; A63B 21/1672; A63B 21/4047; A63B 24/0087; A63B 23/03525; A63B 23/0355; A63B 23/0405; A63B 23/1209; A63B 23/1281; A63B 2024/0093; A63B 2024/009; A63B 2071/068

See application file for complete search history.

(56) References Cited

U.S. PATENT DOCUMENTS

4,436,303 A    3/1984    McKillip
4,518,163 A    5/1985    Bruder
(Continued)

*Primary Examiner* — Loan H Thanh
*Assistant Examiner* — Sundhara Ganesan

(57) ABSTRACT

An exercise apparatus that provides multiple different exercises for a User, including both resistance movements and isometrics. The User interacts with the apparatus by grasping a bar. A resistance mechanism is symmetrically mounted on a second bar and provides infinitely variable resistance to the User, as well as soundproof operation. There is a vertical column that allows infinite positioning of the bars for different bodily exercises, and a bench for support. The User can change the exercise resistance by verbal commands, or the apparatus can vary the exercise resistance in response to the force applied by the User. The apparatus can be operated at locations where electric service is permanently unavailable, or in zero gravity; and the apparatus can be mounted inside a shallow closet and hidden from view. To verify accuracy, the resistance can be calibrated against a known quantity of weight.

13 Claims, 13 Drawing Sheets

(51) Int. Cl.
*A63B 21/078* (2006.01)
*A63B 23/035* (2006.01)
*A63B 71/06* (2006.01)
*A63B 21/00* (2006.01)
*A63B 21/002* (2006.01)
*A63B 21/008* (2006.01)
*A63B 23/04* (2006.01)
*A63B 23/12* (2006.01)
*A63B 21/16* (2006.01)
*A63B 71/02* (2006.01)

(52) U.S. Cl.
CPC ........ *A63B 21/4029* (2015.10); *A63B 23/0405* (2013.01); *A63B 23/1209* (2013.01); *A63B 23/1281* (2013.01); *A63B 2024/009* (2013.01); *A63B 2024/0093* (2013.01); *A63B 2071/025* (2013.01); *A63B 2071/068* (2013.01); *A63B 2071/0658* (2013.01); *A63B 2210/00* (2013.01); *A63B 2210/06* (2013.01); *A63B 2220/51* (2013.01); *A63B 2220/54* (2013.01); *A63B 2220/56* (2013.01); *A63B 2225/093* (2013.01); *A63B 2225/20* (2013.01); *A63B 2225/50* (2013.01)

(56) References Cited

U.S. PATENT DOCUMENTS

| | | | |
|---|---|---|---|
| 4,647,039 A * | 3/1987 | Noffsinger | 482/8 |
| 4,647,041 A | 3/1987 | Whiteley | |
| 4,741,529 A * | 5/1988 | Bloemendaal | 482/112 |
| 4,828,257 A | 5/1989 | Dyer | |
| 4,934,692 A * | 6/1990 | Owens | 482/63 |
| 4,979,734 A * | 12/1990 | Sims | 482/112 |
| 5,020,794 A * | 6/1991 | Englehardt et al. | 482/5 |
| 5,098,088 A * | 3/1992 | Cohen et al. | 482/5 |
| 5,409,435 A * | 4/1995 | Daniels | 482/5 |
| 5,456,644 A * | 10/1995 | Hecox et al. | 482/127 |
| 5,569,120 A * | 10/1996 | Anjanappa et al. | 482/4 |
| 5,605,524 A | 2/1997 | Husted | |
| 5,634,872 A * | 6/1997 | Brown et al. | 473/430 |
| 5,730,686 A | 3/1998 | Nilsson | |
| 6,386,251 B1 * | 5/2002 | Koch et al. | 152/152.1 |
| 7,462,141 B1 | 12/2008 | Raboin | |
| 7,811,201 B1 * | 10/2010 | Mikan et al. | 482/4 |
| 7,892,159 B2 | 2/2011 | McVay | |
| 2005/0233874 A1 * | 10/2005 | Bucay-Bissu | 482/112 |
| 2005/0239602 A1 * | 10/2005 | Cordova et al. | 482/1 |
| 2007/0202992 A1 * | 8/2007 | Grasshoff | 482/8 |
| 2009/0247367 A1 | 10/2009 | Ray | |
| 2012/0329622 A1 * | 12/2012 | Wang | 482/139 |

* cited by examiner

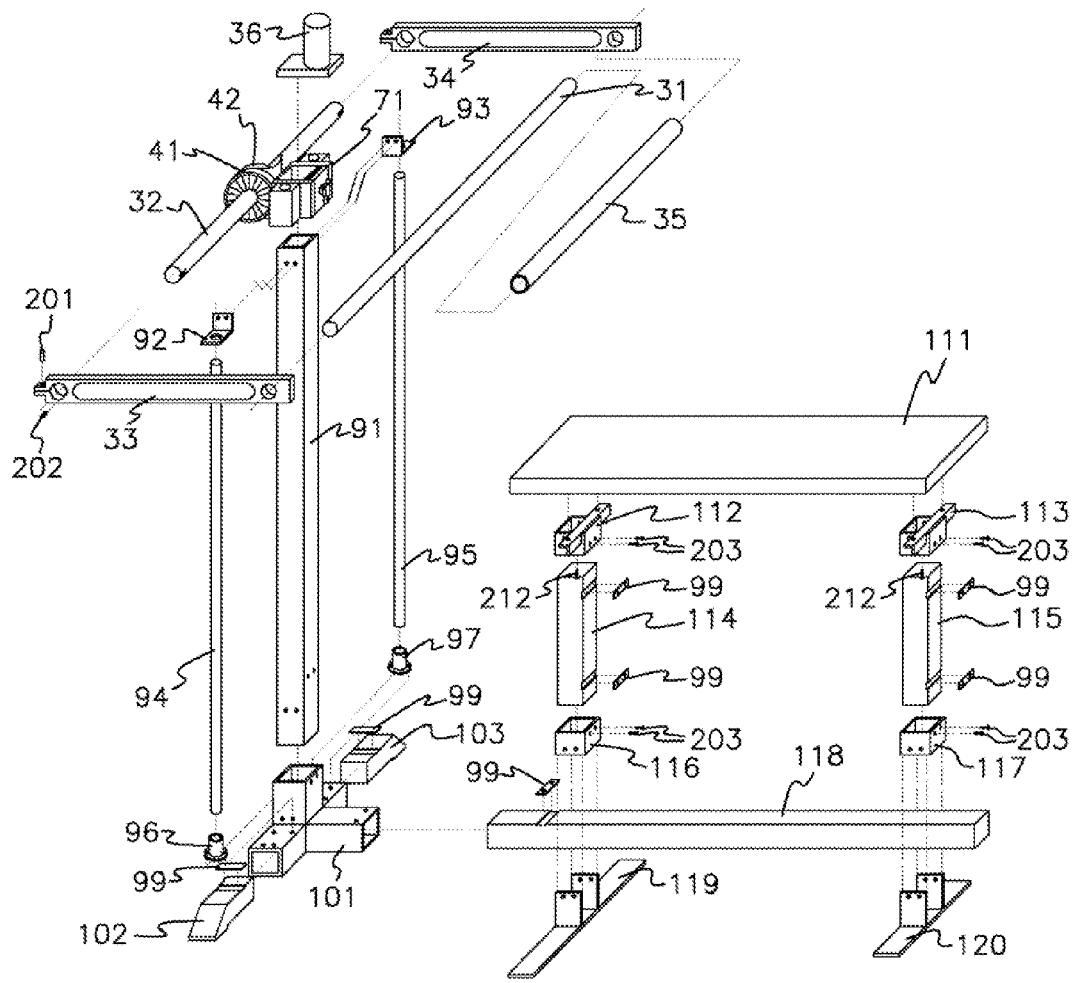
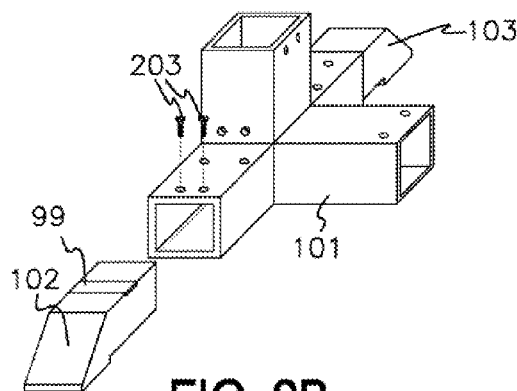 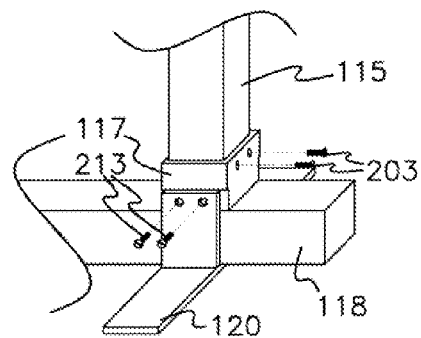
FIG. 2A
FIG. 2B
FIG. 2C

MULTI FUNCTION EXERCISE APPARATUS WITH RESISTANCE MECHANISM

FIELD OF THE INVENTION

The invention generally relates to exercise apparatuses, and more specifically to an exercise apparatus that allows for multiple different bodily exercises.

BACKGROUND OF THE INVENTION

There are many types of exercise machines that have been developed, all intended to offer some unique method of exercise for the User, or improved convenience of design or operation. The universe of such devices can generally be split into two different types: those that use actual weights, also known as free weight, to provide the resistance; versus those that do not use actual weights, but instead use some other means such as stretchable cords, pneumatic cylinders, electric brakes, torque bands, or any number of other methods.

There are many exercise machines that have been developed that do not utilize free weights for their resistance force; and the subject invention is in the category of the devices that do not use free weights for exercise resistance.

Previous attempts such as U.S. Pat. Nos. 5,730,686 and 4,436,303 and 4,257,593 have each presented a multi-functioned exercise apparatus; but these devices do not employ an infinitely adjustable resistance mechanism, symmetrically mounted on a bar.

Other attempts such as U.S. Pat. Nos. 4,518,163 and 4,828,257 and 4,934,694 and 4,930,770 and U.S. Patent Application Publication US 2009/0247367 A1 have presented exercise apparatuses that can react to the movements of the User while performing exercises; but all these apparatuses rely on the measurement of something other than the actual force applied by the User to the apparatus, to then make adjustments in the exercise resistance or other variables presented to the User.

Additional attempts such as U.S. Pat. Nos. 7,892,159 B2 and 5,605,524 and 4,728,101 have used various types of vertical columns or vertical screws or vertical rails to provide adjustment for the User of the exercise resistance or vertical height of the apparatus; but these apparatuses do not allow for quick and infinite adjustment of the vertical height of the exercise apparatus, in relation to the User.

Later attempts such as U.S. Pat. No. 7,927,262 B2 and U.S. Patent Application Publication US 2006/0189457 A1 have presented an exercise apparatus design that is collapsible, to be stored out of sight in a home; but these apparatuses do not allow for infinite adjustment of the exercise resistance.

As a result of the above, and notwithstanding all the attempts made over many years, there remains a need for an exercise apparatus that will allow for a quick and efficient bodily workout for Users at all levels of physical ability; with infinitely variable resistance and infinitely variable vertical adjustment, that is inherently quiet in its operation, and that can respond to the needs of the User as would otherwise require a human spotter.

SUMMARY OF THE INVENTION

This summary is intended to introduce the subject apparatus in a simplified format, which is further described below in the Brief Description and Detailed Description. This summary is not intended to limit the scope of the claimed subject matter.

The inventive subject matter comprises an exercise apparatus that will provide a quick, convenient, and effective exercise routine for Users of all ages and sizes; and can be configured to address the specific needs of many types of Users ranging from the young to the elderly, from the infirm to professional athletes.

This apparatus will offer several advantages. One is to provide an exercise apparatus with infinitely and easily adjustable resistance force in either direction of exercise movement, that is both symmetrical to the User and that remains constant throughout the entire range of motion. This exercise device will also allow for infinite vertical adjustment capability of the exercise bar that is in contact with the User.

Additionally, one configuration of the exercise apparatus can respond to the amount of force that the User is applying to the apparatus, such that the apparatus can change the amount of the resistance force applied to the User, in response to the amount of force that the User is applying to the apparatus.

This exercise apparatus can also be configured to respond to verbal commands of the User, such that the apparatus can provide the assistance that would otherwise require another human to provide. It is therefore more convenient than a human spotter, as this apparatus can change the resistance with greater accuracy in response to the verbal commands of the User, in contrast to a human spotter who has no way of responding with any degree of accuracy to give the User the exact amount of assistance that the User desires at that moment.

Another feature of this apparatus is that it does not utilize free weights for the resistance force applied to the User, but it can be calibrated against a known quantity of free weight so that the User can select a desired level of resistance force to be applied by the apparatus, such that the selected amount of resistance will be the same level of resistance as it would be if the User were performing the same movement with that equal quantity of free weights, as measured in pounds.

One configuration of this apparatus can be provided that is not dependent on external power and can therefore be used in locations where power sources are permanently unavailable, or recreational areas such as at the beach, on manned vehicles in outer space; or for use in medical care facilities, hospitals, or nursing homes, during periods when electricity is temporarily unavailable but patients still have an urgent need for daily exercise.

This exercise apparatus can be operated by the User through any range of motion or level of resistance, while maintaining a sound level from the apparatus of no more than thirty decibels; thereby making it convenient for a User to exercise on the apparatus without disturbing other people nearby such as in a small apartment or even in an office. And, one configuration of this apparatus can be mounted in a shallow recess in a wall so as to be out of sight when not in use.

An additional configuration of this device can be adapted for use by patients in a health care facility, who are bedridden or who have very limited mobility. The apparatus can also provide multi position isometrics.

A further advantage of this apparatus is that the resistance mechanisms as utilized, are all manufactured with specific torque ratings from the manufacturer. A mathematical calculation can be performed, based on the manufacturer's torque rating of the resistance mechanism as configured on the apparatus, which will indicate the maximum exercise resistance, in pounds, that will be available at the exercise bar for the User. Thus, it is possible to accurately match the capability of the apparatus to a specific User or range of Users, who may have particularly high or low average bodily strength.

And, the apparatus can be configured with extremely high levels of exercise resistance provided to the User, such that it would be physically impossible for any User to need more resistance force than the apparatus would be capable of providing.

BRIEF DESCRIPTION OF THE DRAWINGS

The subject apparatus, in accordance with one or more configurations, is described with reference to the following figures. These drawings are provided for purposes of illustration only and merely depict typical configurations of the apparatus. These drawings shall not be considered limiting of the breadth, scope, or applicability of the invention. For clarity and ease of illustration these drawings are not necessarily made to scale.

FIG. 2A is an exploded view from the left side of the apparatus, showing the components of the vertical column and support bench.

FIG. 2B is an expanded view of the vertical column base.

FIG. 2C is an expanded view of the bench support.

DETAILED DESCRIPTION OF THE DRAWINGS

Figure 1:
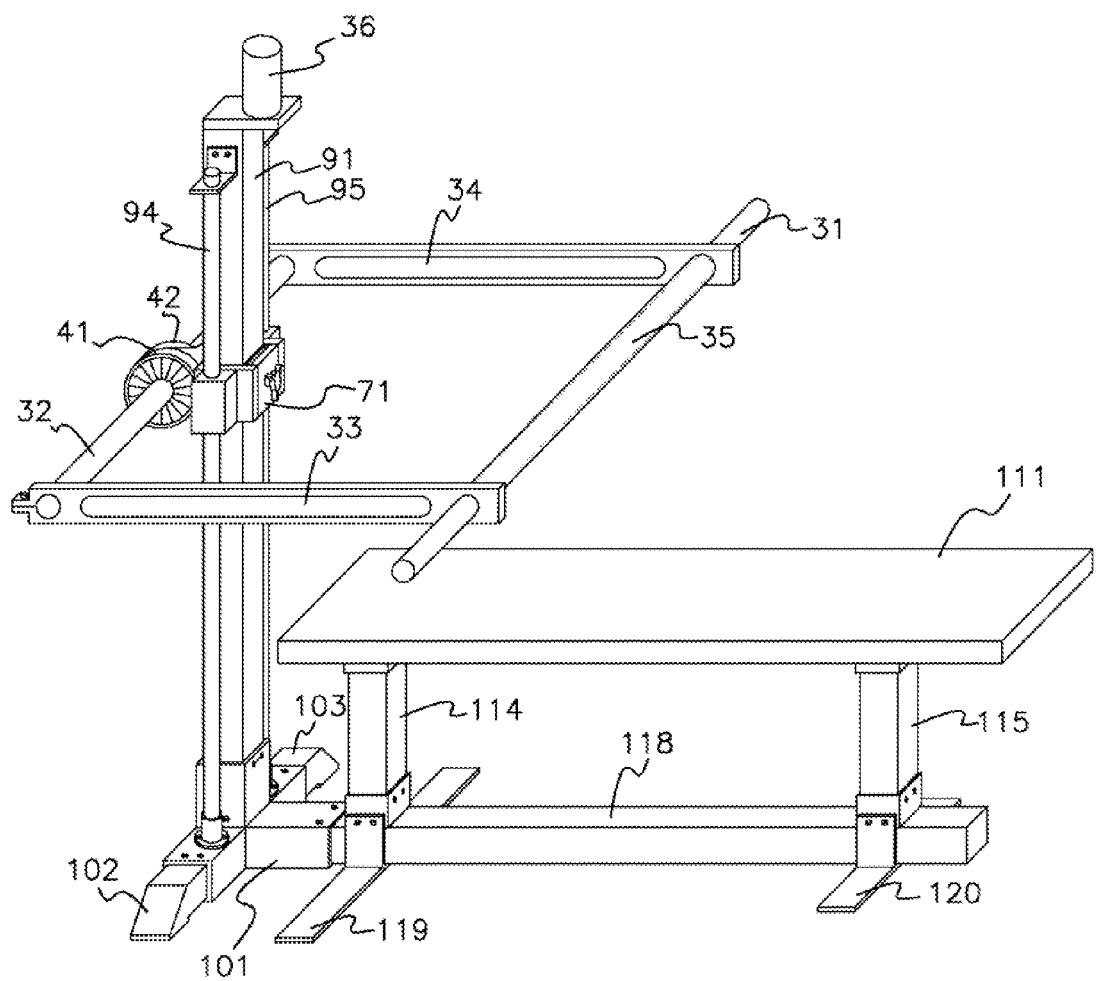
FIG. 1 is a left front view of one configuration of this apparatus, as set up for a Bench Press exercise.

These detailed descriptions are not intended to be exhaustive or to limit the invention to the precise form disclosed; as the invention can be practiced with numerous modifications and alternate configurations. This description is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness.

The invention is applicable to other embodiments or of being practiced or carried out in various ways; and the invention will be limited only by the claims and the equivalents thereof.

Unless defined otherwise, all technical and scientific terms used herein have the same meaning as commonly understood to one of ordinary skill in the art to which this invention belongs. As used herein and in the appended claims, the singular forms "a" "an," and "the" include plural referents unless the context clearly dictates otherwise. All of the phraseology and terminology employed herein is for the purpose of description and should not be regarded as limiting.

The terms "torque" and "force" are used herein. Torque is generally defined as the tendency of a force to cause rotational motion; and torque is determined by multiplying the applied force by the distance from the pivot point to the point where the force is applied. As relates to this apparatus, the "pivot point" would be a tension bar described below; and the "applied force" would be the User's exertion against an exercise bar described below. While the terms "torque" and "force" have distinct meanings, the use of these words herein is for the purpose of description and should not be regarded as limiting. For example, one component of the apparatus as described below is a "magneto elastic torque sensor." However, it may be the case that an OEM vendor will alternatively create a sensor for this apparatus which measures force rather than torque; and thus the distinction of "force" versus "torque" should not be regarded as limiting the scope of he invention, including the claims and the equivalents thereof.

FIG. 1 shows this exercise apparatus set up for a standard exercise movement such as the Bench Press. There is an exercise bar 31 that is attached to a connecting bar left 33 and a connecting bar right 34, which are attached to a tension bar 32. The best length for the bars 33 and 34, and for the exercise bar 31 and thus the tension bar 32, will depend on the stature of the typical Users. The apparatus as presently configured has a length of thirty six inches for the connecting bars 33 and 34 from tip to tip, and thirty two inches for the exercise bar 31 and the tension bar 32 from tip to tip, which will work well for the majority of typically sized Users.

The connecting bars 33 and 34 will best have indentations cut into both sides as shown, in order to reduce the weight of the bars 33 and 34. The attachment of the bar 31 to the bar 33 and the bar 34 will best be accomplished as a zero tolerance press fit. The tension bar 32 goes directly through and is supported by a resistance mechanism left 41 and a resistance mechanism right 42. The resistance mechanisms 41 and 42 are attached to a resistance mechanism bracket 71. The bracket 71 is attached to a vertical column 91 and a linear bearing rod left 94 and a linear bearing rod right 95, and is able to move up and down. There is a drive motor 36 that is attached to the column 91. The column 91 is held upright by a vertical column structural base 101, and the base 101 is stabilized by a vertical column base leg left 102 and a vertical column base leg right 103. There is a bench 111 that a User can sit or lie upon, which is supported by a bench leg rear 114 and a bench leg front 115; which are supported by a bench floor brace rear 119 and a bench floor brace front 120 respectively and are stabilized by a bench cross brace 118.

FIG. 2A shows an expanded view of the column 91 and the bench 111 components. The motor 36 is mounted on top of the column 91, with the resistance mechanisms 41 and 42 mounted on the bracket 71. There is an exercise bar sleeve 35 that surrounds the bar 31 and gives the User a comfortable object to grasp while performing bodily exercises, to avoid any risk of blistering the hands as would likely happen without the bar sleeve 35. There is a groove at the ends of the bar 32 which will accept a connecting bar key insert 202. The key insert 202 is held in place by a connecting bar clamping bolt 201 and with proper tightening of the bolt 201, the bars 33 and 34 will remain fixed in position relative to the tension bar 32, such that any movement of the exercise bar 31 will cause a rotation of the tension bar 32.

There are two linear bearing rods, the linear bearing rod left 94 and the linear bearing rod right 95, that are held in a vertical position by a linear bearing rod upper bracket right 93 and a linear bearing lower bracket right 97 and a linear bearing rod upper bracket left 92 and a linear bearing lower bracket left 96.

The vertical column base leg left 102 and the vertical column base leg right 103 are held in position in the base 101 by the pressure that is applied by a bench assembly bolt 203, which causes a brass compression plate 99 to be pressed firmly into a suitably sized notch in the vertical column base leg left 102 and the vertical column base leg right 103, which keeps the base legs 102 and 103 in a fixed position for maximum rigidity of the entire exercise apparatus.

The bench 111 is attached to a bench leg upper bracket rear 112 and a bench leg upper bracket front 113 by a bench bracket bolt 212 in several locations that go through the brackets 112 and 113 into the underside of the bench 111. These can be any style of readily available bolts that have suitable thread design and sufficient strength to screw into the bench 111 and thus keep the brackets 112 and 113 rigidly attached to the bench 111. Alternatively, the bench 111 can be attached by way of carriage bolts (not shown) that will go through the bench 111 from the top side of the bench 111 and then through the brackets 112 and 113, with nuts and washers (not shown) attached from the bottom of the brackets 112 and 113.

The bench 111 is then attached to the bench leg rear 114 and the bench leg front 115 with the brackets 112 and 113. The attachment method is identical to that described above, whereby the bolt 203 goes through the brackets 112 and 113, and is tightened against the brass plate 99, such that the brass plate 99 is pressed into a suitably sized slot in the legs 114 and 115; causing the legs 114 and 115 to be held firmly in position in relation to the bench 111 and the brace 118. The same method is used to attach the bench leg rear 114 and the bench leg front 115 to the brace 118. The bottom of the legs 114 and 115 fit into a bench leg lower bracket rear 116 and a bench leg lower bracket front 117 respectively.

The bench floor brace rear 119 and the brace front 120 are attached to the brackets 116 and 117 by way of a floor base side bolt 213 which goes through the sides of the brace 119 and the brace 120 and screws into a suitably threaded hole in the side of the brackets 116 and 117. The brace 118 is then attached to the column base 101 in the same manner, with the bolt 203 going through the front section of the base 101 and tightening against the brass plate 99 that is in position in a suitably sized slot at the rear of the bench brace 118.

FIG. 2B shows an expanded view of the structural base 101 and the brass compression plate 99 and the vertical column base legs 102 and 103.

FIG. 2C shows an expanded view of the bench leg front 115 and the bench leg lower bracket front 117 and the bench cross brace 118 and the bench floor brace front 120.

Figure 3:
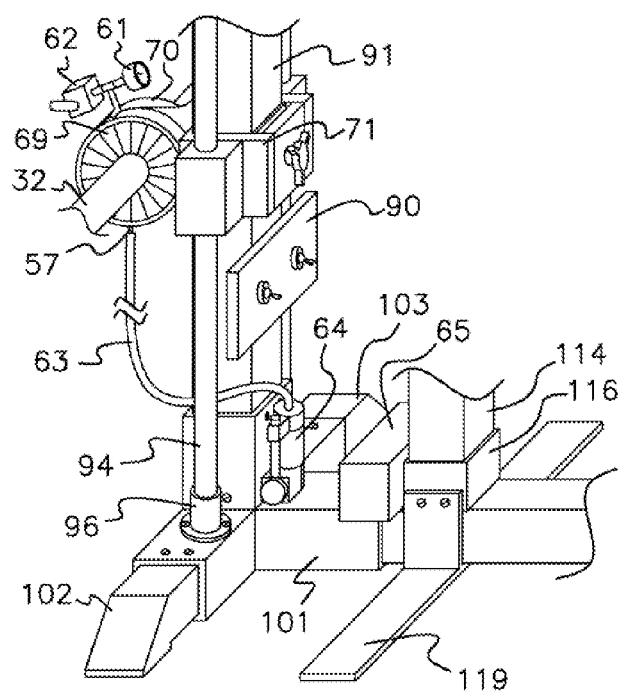
FIG. 3 is an expanded view showing the battery box, electric air pump, toggle switches, air pressure gauge and air relief valve.

FIG. 3 shows the apparatus as configured with a pneumatically actuated resistance mechanism left 69 and a pneumatically actuated resistance mechanism right 70; which are mounted on the bracket 71. The bracket 71 surrounds the tension bar 32, as the bar 32 goes directly through the bracket 71. There is an air pressure gauge 61 which will indicate to the User the amount of air pressure that is currently in the resistance mechanisms 69 and 70. The gauge 61 may be a dial type gauge or it may be a digital gauge, depending on the final configuration of the apparatus.

Figure 4:
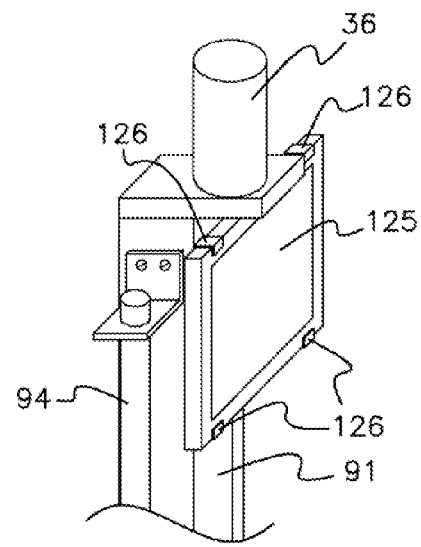
FIG. 4 is an expanded view showing a tablet type mobile voice sensing receiver, mounted on the vertical column.

There is an air release valve 62 attached to the pressure gauge 61. Each of the resistance mechanisms 69 and 70 have an air nipple 57 attached; which is attached to an air supply hose 63. There is an air compressor 64 which can be turned on and off by way of a toggle switch on a toggle switch panel 90; which is attached to the column 91. The air compressor 64 is a common twelve volt unit and can be sourced from numerous retailers. An internet search for the phrase "twelve volt compact air compressor" will discover any number of twelve volt air compressors that will work sufficiently for this apparatus. The panel 90 contains a toggle type on/off switch for the operation of the air compressor 64, and also a toggle type up/down switch for the operation of the drive motor 36 (which is shown in FIG. 4).

For applications requiring extended use of the apparatus in locations where there may not be a continuous supply of electric power, the apparatus will include a twelve volt battery (not shown), which will be housed inside of a battery box 65. The battery will best be selected from any major retailer such as an auto parts store, marine supply store, or other specialty shops such as a golf cart supply store; where a compact twelve volt battery can be sourced which will have sufficient power to run the apparatus for several hours or more before recharging is needed, and will also be sufficiently compact to be housed inside the battery box 66 without being in the way of the User.

The battery can be recharged with any readily available twelve volt battery charger, which typically include quick charge models as well as trickle charge units that may be left plugged in over night for recharging. If desired by any particular User, the apparatus would be supplied with the twelve volt battery charger included with the apparatus. In that case, the twelve volt battery charger (not shown) can be mounted in any of several suitable locations on the apparatus such as under the bench 111, so as to be out of the way of the User while performing bodily exercises.

For applications where power is always available, the battery box 65 can be used to house a standard one hundred ten volt to twelve volt transformer (not shown), which can be sourced from numerous vendors. Similar type transformers are typically used in residential homes to supply current to door bells or intercoms. In this configuration, it will be best to match both the output voltage and the output amperage of the transformer to the correct voltage and amperage as required by the motor 36 and by the air compressor 64.

FIG. 4 shows this apparatus with the addition of a mobile device 125 mounted on the column 91 by way of a mobile device mounting clip 126 placed at each corner. Those skilled in the relevant art will appreciate that the mobile device 125 can be any manner of mobile device including but not limited to; wireless devices, Internet appliances, personal digital assistants (PDAs), wearable computers, tablet computers, netbook computers, cellular or mobile phones, mobile tablets, microprocessor-based or programmable consumer electronics, and the like. Thus, "mobile device" as used herein may refer to any of the above devices or systems including any future variations of these mobile devices that may be developed, which are not yet available in the consumer markets.

Figure 5:
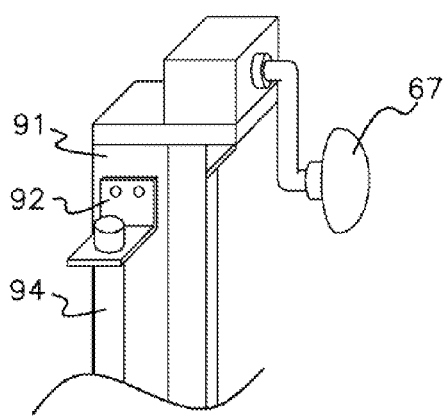
FIG. 5 is an expanded view showing the manual hand crank.

FIG. 5 shows a vertical adjustment crank 67 mounted on the column 91; for applications where electrical power is either permanently unavailable or so unreliable as to be impractical, such that the use of a twelve volt battery that will periodically need recharging is not feasible.

Figure 6:
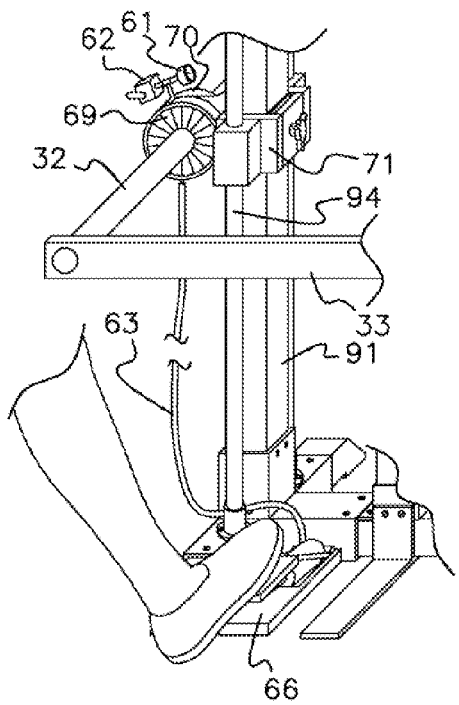
FIG. 6 is an expanded view showing the manual air pump and air hose.

FIG. 6 shows a manual air pump 66 which is similarly intended for applications where electrical power is either permanently unavailable or so unreliable as to be impractical. The pump 66 is mounted to the structural base 101, and delivers air to the resistance mechanisms 69 and 70 by way of the air hose 63.

Figure 7A:
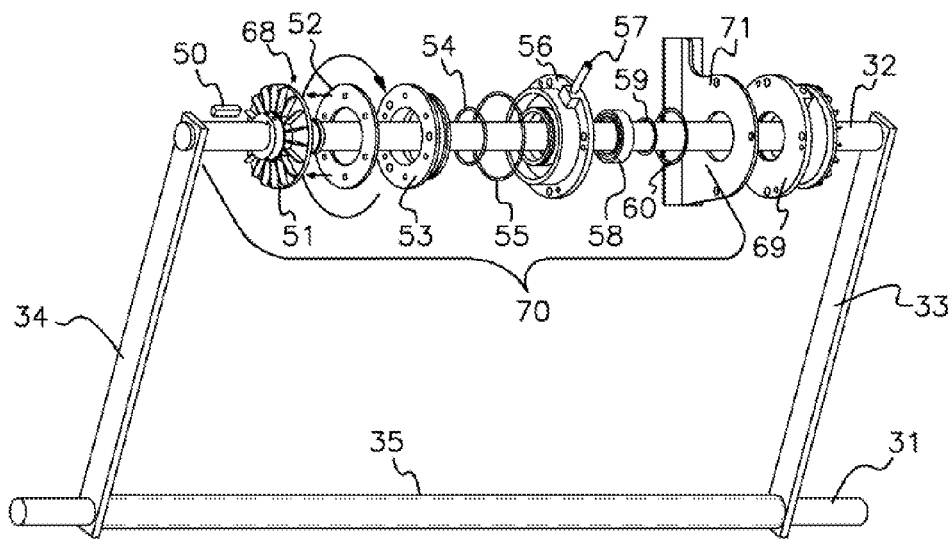
FIG. 7A is an exploded view showing the components of the pneumatically actuated resistance mechanisms.

FIG. 7A shows a detailed view of the components of the pneumatically actuated resistance mechanisms 69 and 70. The configuration of the resistance mechanism 70 as shown here in an exploded view, displays the essential parts of the mechanism. Starting from the left side, there is a hub 51 which is locked in position to the tension bar 32 by way of a hub key 50 and a hub set screw 68. Next there is a pneumatically actuated disc 52 which is compressed against the hub 51 by a disc piston 53. Next there is a small o-ring 54 and a large o-ring 55. A disc air chamber 56 holds compressed air, such that the force or pressure of the disc piston 53 against the pneumatically actuated disc 52 and the pneumatically actuated disc 52 against the hub 51 is increased as the air pressure in the disc air chamber is increased. There is the air nipple 57, an air chamber bearing 58, a small retaining ring 59 and a large retaining ring 60.

It is this increase or decrease in air pressure in the disc air chamber 56 and the corresponding increasing or decreasing of the force of the disc piston 53 against the pneumatically actuated disc 52 and the disc 52 against the hub 51, that results in an increase or decrease in the exercise resistance that the User will be working against at the bar 31, while performing bodily exercises.

In addition to the parts shown, there will normally be one or more springs (not shown), that serve to return the piston 53 toward the air chamber 56, when air pressure is released. And, it will be best to include a one way valve (not shown), between the air compressor 64 and the resistance mechanisms 41 or 42.

It is reasonable to expect that more modern or future versions of the resistance mechanisms 69 and 70 may have different arrangements or configurations of the various parts, and this version as shown in FIG. 7A was selected due to its simplicity of design.

As shown in FIG. 7A, the disc 52 is six inch in diameter. An internet search for the term "air engaged friction brake" or "through shaft heavy duty clutch" will discover a variety of OEM vendors who produce these type of pneumatic discs and pneumatic clutches, which may also be called "pneumatic brakes" depending on the terminology of the manufacturer. The best size for the disc 52 and therefore the hub 51 and the associated parts of the pneumatic resistance mechanism 69 and 70 as shown in FIG. 7A, will depend on several variables; including what physical size of the typical User that the apparatus is being configured for, how many hours per week the apparatus will typically be operating, and what environment the apparatus will be operating in.

An internet search for the term "maximum torque rating for pneumatic brake" will discover various OEM manufacturer sites, which will have model sizes with torque ratings. A typical maximum torque rating for the pneumatically actuated resistance mechanisms 69 and 70, as disclosed by various manufacturer web sites, is three thousand pound inches. With two such brakes in position on the bar 32, as shown in FIG. 7A, that would yield a maximum exercise force available at the exercise bar 31, of one hundred sixty six pounds, if the bars 33 and 34 are thirty six inches long.

FIG. 7A also has directional arrows added to the drawing, to show that the force applied by the air pressure of the disc air chamber 56 against the disc piston 53, and by the piston 53 against the disc 52, and by the disc 52 against the hub 61, are in a direction that is parallel to the tension bar 32. Additionally, the force applied by the piston 53 against the disc 52 and by the disc 52 against the hub 51, due to the fully circular shape of these parts including the disc piston 53 and the pneumatically actuated disc 52 and the hub 51, is therefore in a full three hundred sixty degree configuration around the tension bar 32. This design inherently results in a constant application of the exercise resistance force as applied by the apparatus to the User, without any variance, regardless of the position of the bar 31 and regardless which direction the User is moving the bar 31.

Additionally, the resistance mechanisms 69 and 70 are positioned at the center point of the tension bar 32 in relation to the ends of the bar 32, and thus provide exercise resistance in a symmetrical configuration to the tension bar 32 and also to the ultimate User, who will optimally be positioned at the left/right center point of the bar 31 while performing bodily exercises.

Figures 7B, 7C:
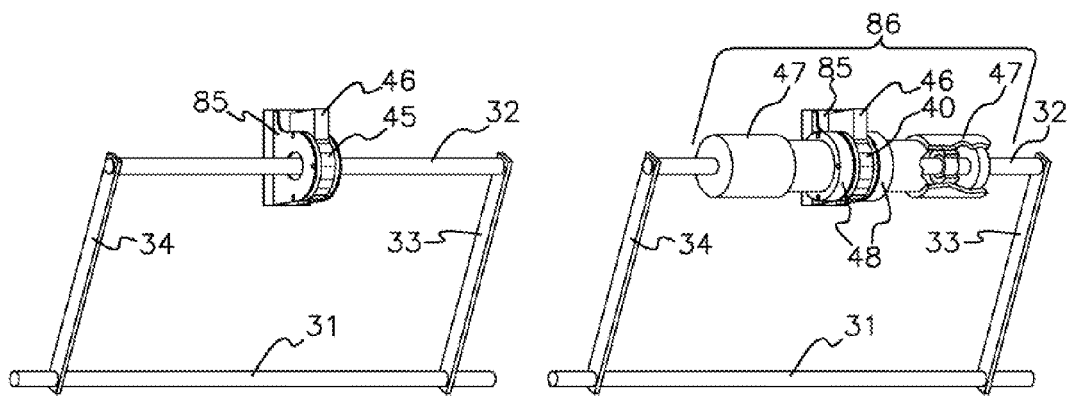
FIG. 7B is a rear view showing the electric resistance mechanism mounted on the support bracket.
FIG. 7C is an exploded view of one of the magneto elastic torque sensors, and the electro magnetic particle brakes, and stepper motor, and second torque sensor; mounted on the support bracket.

FIG. 7B shows a resistance mechanism control unit 46, and an electric resistance mechanism 45 which is mounted substantially symmetrically on a resistance mechanism double flange bracket 85. The electric resistance mechanism 45 can be any variety of electrically actuated resistance mechanisms available from commercial vendors, including but not limited to: an electromagnetic clutch, electromagnetic brake, electromagnetic particle brake, electromechanical brake, electric clutch, electric brake, an electromagnetic particle clutch, or an electro pneumatic brake. All of these types of brakes which are mounted on a bar with the bar passing directly through the brake, typically apply their resistance force in a circular configuration around the bar that the brake is attached to. This is a very desirable feature, as this allows for a very smooth sensation of consistent resistance as applied by the apparatus to the User, as the User is grasping the bar 31 and moving it for bodily exercise. Additionally, this design inherently results in a constant application of the exercise resistance force as applied by the apparatus to the User, regardless of the position of the bar 31 and regardless which direction the User is moving the bar 31.

FIG. 7C shows a torque sensing and positioning resistance mechanism 86, which is a combination of a stepper motor 40 at the center point of the bar 32, with an electro magnetic particle brake 48 on each side of the motor 40, and a dual configuration of a magneto elastic torque sensor 47, such that there is one of the torque sensor 47 mounted on each side of the stepper motor 40. An Internet search for the term "magneto elastic sensor" will discover various devices that would work well for this apparatus. The purpose of the torque sensor 47 is to enable this apparatus to detect the exact amount of force being applied by the User to the apparatus, and to have the capability to do so even if the User is straining and has therefore stopped moving the bar 31 and thus the tension bar 32.

It will often be the case that a User who desires to perform a maximally taxing workout, may be momentarily unable to move the bar 31 any further, but may nevertheless still be applying a measureable amount of force to the apparatus. The torque sensor 47 is able to detect the force applied by the User to the apparatus, even when the bar 31 is not moving and therefore the bar 32 is not turning; so that the apparatus can then adjust the resistance force applied to the User as desired by the User according to the User's prior selections or preset variables controlled by the apparatus.

Devices such as the magneto elastic torque sensor 47 are designed to measure the torque of a bar, or shaft. Some of these types of devices have more robust capabilities and can measure the torque of a bar while the bar is stationary; and that will be the best configuration for this apparatus. The force that the User is exerting on the bar 31, while performing physical exercises with this apparatus, will result in a torque measurement by the magneto elastic torque sensor 47, which will cause a signal to be transmitted by the torque sensor 47 to a solid state control device 49. Based upon that signal, which will be an indication of the present force being applied by the User to the apparatus, the control device 49 will then respond appropriately and, depending on the User's desires or prior indication, change the resistance force applied by the apparatus to the User.

The particle brake 48 may be any manner of electric brake. An internet search for the term "electro magnetic particle brake" will discover various devices that would work well for this apparatus. And, the stepper motor 40 may be various types of stepper motors. An internet search for the term "stepper motor" will discover various devices that would work well for this apparatus. However it is not possible to specify exactly which electro magnetic particle brake or stepper motor will be best for each potential configuration of this apparatus; as that will ultimately require collaboration with an OEM vendor, to determine that. The variables to be considered would include: what physical size of User the apparatus is being configured for, how many hours per week the apparatus will typically be operating, and what environment the apparatus will be operating in.

Figures 7D, 7E, 7F:
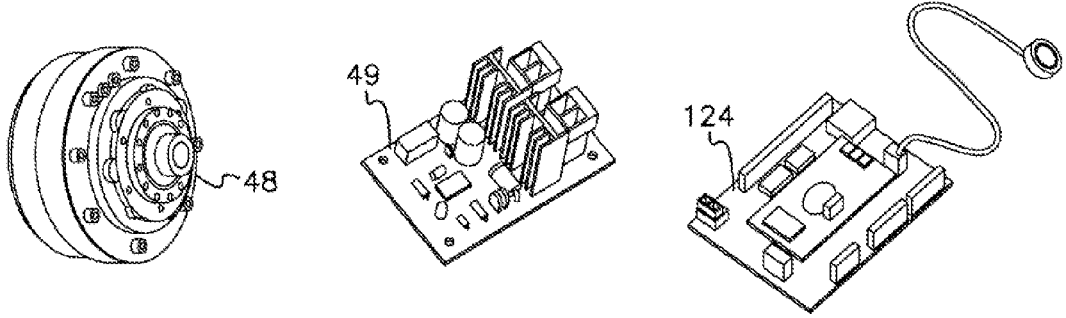
FIG. 7D is an expanded view of the electro magnetic particle brake.
FIG. 7E is an expanded view of the solid state controller.
FIG. 7F is an expanded view of the voice recognition module.

FIG. 7D shows an expanded view of the particle brake 48. One configuration of this apparatus will have the particle brake 48 as the resistance mechanism. In that case, the apparatus may have one or more of the brake 48, as appropriate for the needs of the User. For example, if this apparatus is configured to be used by a professional football team, it will likely be appropriate to have either a larger sized particle brake 48 or more than one particle brake 48.

The mounting of the particle brake 48 will always be substantially at the center point of the tension bar 32, such that the resistance as applied by the particle brake 48, will be applied symmetrically to the tension bar 32 and thus symmetrically to the User by way of the exercise bar 31.

FIG. 7E shows the solid state control device 49. An Internet search for the term "solid state controller for magnetic brake" will discover a number of vendors who can provide this type of device. However, it is not possible to specify exactly what model of the solid state control device 49 will be best for this apparatus; since this apparatus can be assembled and marketed in multiple different configurations, many of which will require different types or capacities of solid state control devices for this apparatus to function properly. It will ultimately require collaboration with an OEM vendor, to determine what specific type of solid state control device 49 to include as the best solution for each of the various different configurations of this apparatus.

FIG. 7F shows a voice recognition module 124. There are a number of devices available that can serve as a voice recognition module for this apparatus; and an Internet search for the term "voice recognition module" will discover a number of units that will work sufficiently well. To the User this would function the same as any of the voice recognition modules that a consumer will often encounter when calling an automated customer service phone number, where the caller will be prompted by an automated attendant, to speak information such as an account number. These types of voice recognition modules are well designed to accurately recognize a wide range of human voices and accents, but they are not infallible.

Alternatively, there are many consumer products that already have voice sensing capabilities, including but not limited to: cell phones, mobile tablets and remote control devices. Any device that has the capability to recognize a human voice and send a signal to the control device 49, will be within the scope of the many different types of voice recognition modules that could be utilized in this apparatus. The signal sent by the voice recognition module 124 to the control device 49 could be in many formats including but not limited to: an electronic pulse by hard wire connection, a signal sent by a short range wireless connection, a typical wireless local area network connection, an infrared pulse, or any other type of connection or transmission technology that enables the signal to be received by the control device 49 from the voice recognition module 124.

Figure 8A:
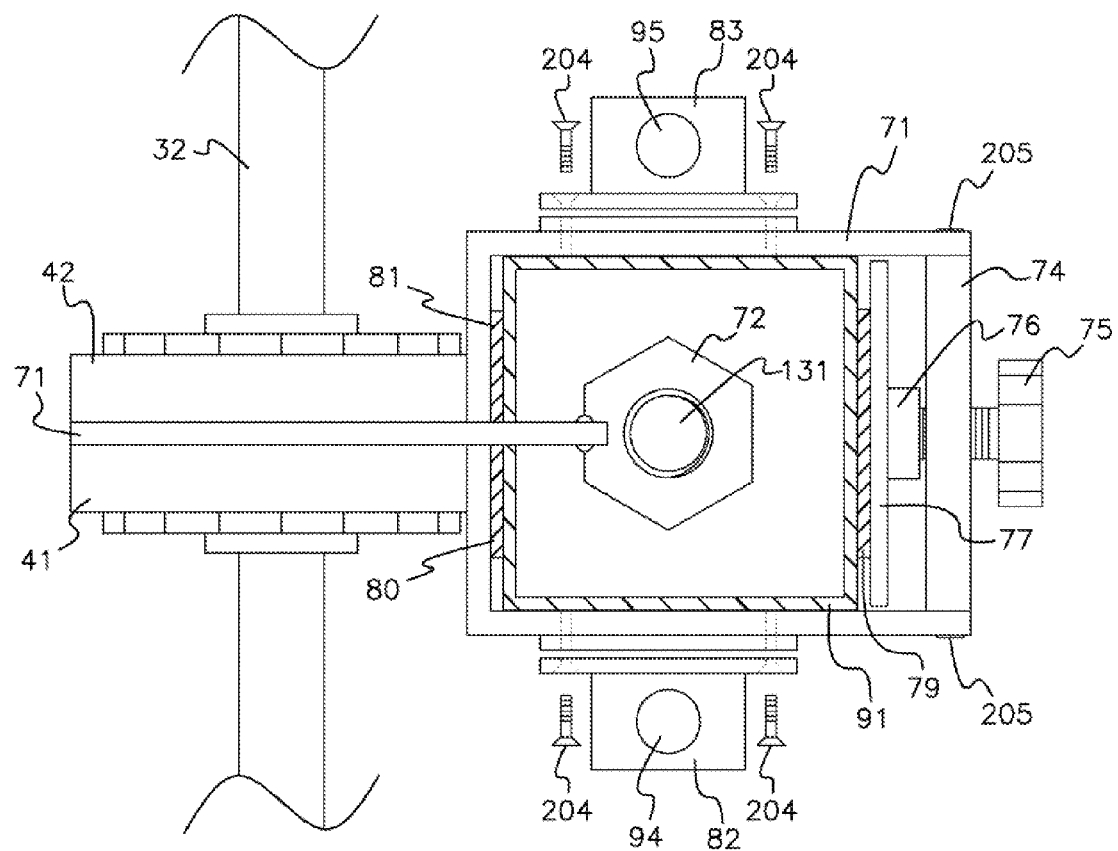
FIG. 8A is an exploded top view of the support bracket, vertical column, linear bearing rods, and screw.

FIG. 8A shows a detailed view of the components of the resistance mechanism bracket 71. There is a vertical screw 131 in the center, which is connected to the bracket 71 by way of a bracket upper nut 72. The bracket 71 is also connected to a linear bearing housing left 82 and a linear bearing housing right 83, and the column 91.

The bracket 71 at the rear of the apparatus is best manufactured from a single piece of steel for maximum strength and rigidity. A steel H beam of sufficient size is cut and machined to form the flange section at the rear of the bracket 71 which the resistance mechanisms 41 and 42 are mounted to, and also the section of the bracket 71 that rides against the column 91. Additional sections of the bracket 71 are welded together and this will best be accomplished by using high strength steel plates, such that the resistance bracket 71 in finished form will have very high strength.

High strength of the bracket 71 is necessary, as it is the bracket 71 that is absorbing the force that will be applied by the User, to the exercise bar 31, which by way of the connecting bars 33 and 34 transfer that force to the tension bar 32, which transfers that torque through the resistance mechanism or resistance mechanisms that are present on the apparatus, to the bracket 71 and ultimately to the column 91 and the screw 131 and the linear bearing housings 82 and 83. If any of these parts of the apparatus have insufficient strength, then it would be possible that a particularly strong User, while performing an exercise at the maximum resistance that can be achieved by the apparatus, and thus applying significant force to the apparatus through the tension bar 32, could cause any or all of these parts to crack or break. Thus, all components will best be fabricated from sufficiently strong materials.

Additionally, it is the design of the bracket 71 and the column 91 combined with the bearing housings 82 and 83, which in combination achieve a very high strength structure. On either side of the bracket 71 there are linear bearing rods which are attached to the resistance mechanism bracket 71. Specifically, the rods 94 and 95 go through the linear bearing housings 82 and 83 respectively, which connect the rods 94 and 95 to the left and right sides of the bracket 71. There are four each of a linear bearing bracket bolt 204 on the bearing housing 82 and four of the linear bearing bracket bolts 204 on the housing right 83, to attach the housings 82 and 83 to the bracket 71.

Continuing with FIG. 8A, on the back side of the bracket 71, there is a support bracket shim left 80 and a support bracket shim right 81, which give the bracket 71 a smooth surface to ride against, while the bracket 71 is moved up and down as needed for the User to perform different types of bodily exercises. These shims 80 and 81 will best be made from a plastic material such as polypropylene, to enable the resistance bracket 71 to move smoothly up and down the column 91, while also allowing a small amount of compression of the shims as needed in areas where the column 91 may have a slight taper due to manufacturing or other irregularities; as otherwise the bracket 71 could become difficult or unable to move up or down.

Continuing with FIG. 8A, on the front side of the bracket 71, there is a support bracket access plate 74, held in place by a resistance mechanism bracket access plate bolt 205. The access plate 74 allows for the assembly of the resistance bracket 71 along with its internal components. There is a support bracket adjustment knob 75 which can be manually turned by the User, to maintain a snug fit of the bracket 71 against the column 91; and also to lock the bracket 71 in place in relation to the column 91, which will be desirable in cases when a very high amount of resistance is selected by the User for a particular bodily exercise. The best design of the knob 75 will be a three pronged star shaped crank which can be easily grasped by a human hand, and readily turned without need for any tool.

Continuing with FIG. 8A, as the knob 75 is tightened, it will press against a support bracket compression plate 77, which then presses against a support bracket shim front 79; such that the total strength of the combination of the bracket 71 and the column 91 and the housings 82 and 83, is nearly as strong as would be the case if all those parts were one continuous structure.

The front shim 79 serves the same purpose as the shims 80 and 81 that are on the rear of the bracket 71. The shim 79 is best made of a plastic material such as polypropylene, which will allow for smooth movement of the bracket 71 in relation to the column 91. It will also allow some amount of compressability, so that the bracket 71 can continue to slide and move against the column 91, even in places along the column 91 where there may be slight variations of size or wall thickness of the column 91; which could otherwise cause the bracket 71 to be stuck in position and unable to move up or down.

Figure 8B:
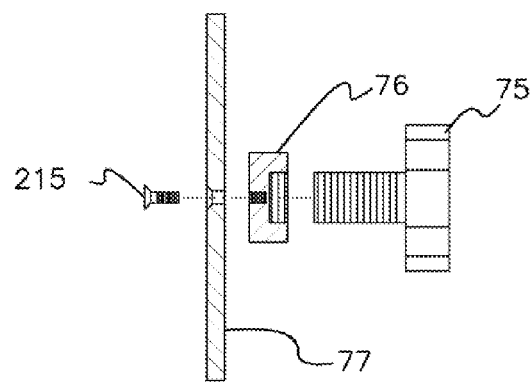
FIG. 8B is an exploded view of the adjustment knob, compression plate, and bearing.

FIG. 8B shows an exploded view of the knob 75 and an adjustment knob bearing 76 and the compression plate 77. The bearing 76 is designed so that a bearing assembly bolt 215 and the knob 75 can both screw into the bearing 76; such that the outer wall of the bearing 76 will remain stationary while in contact with the plate 77, but at the same time, the inner walls of the bearing 76 which the knob 75 is screwed into, will rotate independently of its outer walls. Thus, the knob 75 can be loosed or tightened while also maintaining firm pressure of the bracket 71 against the column 91.

Figure 9A:
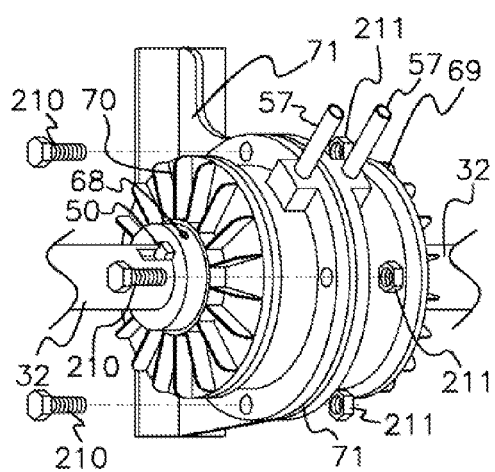
FIG. 9A is an expanded view of two pneumatically actuated resistance mechanisms, mounted on the support bracket.

FIG. 9A shows an expanded view of the mechanisms 69 and 70 as attached to the bracket 71. The flange of the bracket 71 is at the center point of the apparatus in relation to the outer left and right sides of the bar 32, and the resistance mechanisms 69 and 70 are directly mounted to the flange of the bracket 71, thus establishing a symmetrical application of the force created by the resistance mechanism 69 and 70, as applied to the tension bar 32 and to the exercise bar 31, and thus in relation to the User.

There is a resistance mechanism mounting bolt 210 and a resistance mechanism mounting nut 211 at various points around the resistance mechanisms 69 and 70, which serve to keep the resistance mechanisms 69 and 70 firmly attached to the bracket 71. The tension bar 32 has an indentation of appropriate size for the hub key 50 to fit into that indentation in the bar 32. The key 50 also fits into a notch in the hub 51 (shown in FIG. 7A), such that when the set screw 68 is tightened, it locks the hub 51 into a fixed position in relation to the bar 32. The resistance mechanism 69 has an identical arrangement with an indentation in the bar 32 such that the hub key 50 fits into that indentation and also fits into the notch in the hub 51, which is a subcomponent part of the resistance mechanism left 69, as shown in FIG. 7A.

Figure 9B:
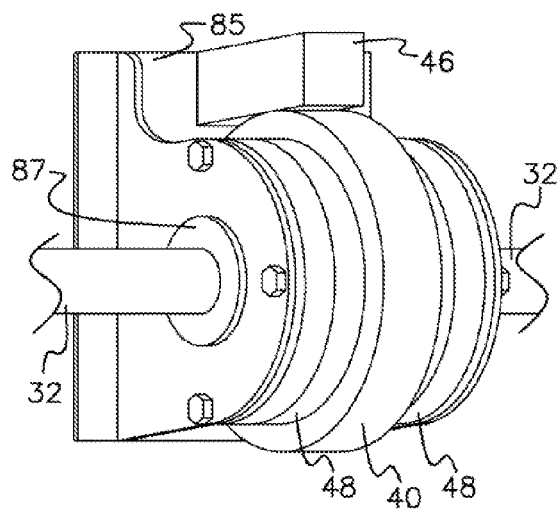
FIG. 9B is an expanded view of the stepper motor with an electro magnetic particle brake on either side, mounted on the double flange support bracket.

FIG. 9B shows the resistance mechanism double flange bracket 85 with a support bracket flange bearing 87 added to the flanges of the bracket 85, plus the stepper motor 40 mounted in the center, with the brake 48 on the left side of the motor 40 and also the second brake 48 on right side of the motor 40.

Figure 9C:
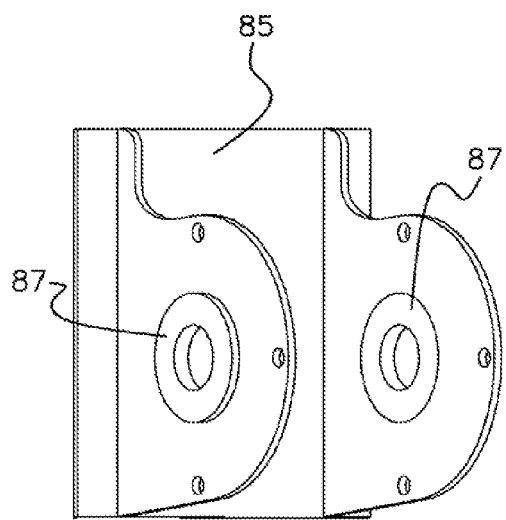
FIG. 9C is an expanded view of the double flange support bracket, with a bearing in each flange.

FIG. 9C shows the double flange bracket 85 with the support bracket flange bearing 87 added to each of the outer flanges of the double flange bracket 85. The best configuration of the support bracket will be the double flange design with two of the bearings 87, shown here; however, the apparatus would likely be offered in a lower cost basic configuration that would be configured with the bracket 71, which only has the one flange.

Figure 9D:
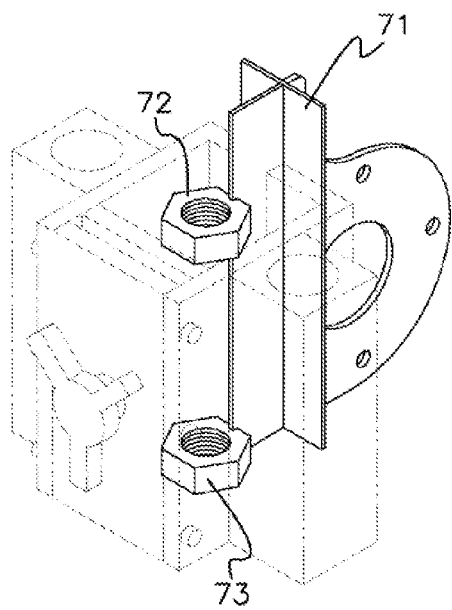
FIG. 9D is an expanded view of the single flange support bracket, showing the internal upper and lower vertical screw connecting nuts.

FIG. 9D shows the design of the bracket 71, which is one continuous steel structure. There is the bracket upper nut 72 and a bracket lower nut 73. Both of these, the nut 72 and the nut 73, are best welded directly to the bracket 71, and as seen in FIG. 8A, it is best if the nuts 72 and 73 are first milled so that there will be a perfectly sized groove in the nuts 72 and 73, such that the inner plate of the bracket 71 will be a very tight fit or best a press fit into the grooves of the bracket nuts 72 and 73; and therefore when the weld is performed to permanently join the nuts 72 and 73 to the bracket 71, the final assembly will have very high strength.

Figure 10:
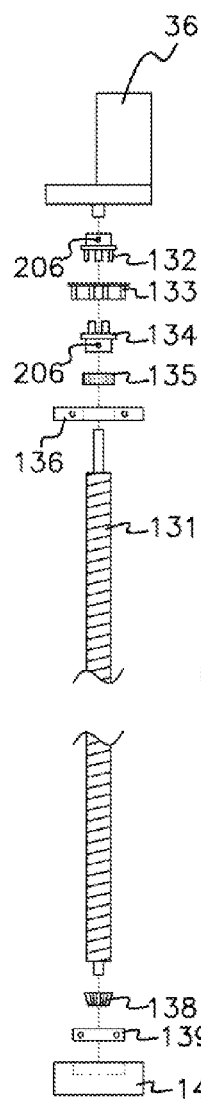
FIG. 10 is an exploded side view of the drive motor, vertical screw, mounting brackets, and screw coupling hubs.

FIG. 10 shows an exploded view of the vertical screw 131, which is positioned inside of the vertical column 91 (not shown here). Starting from the top, there is the drive motor 36 which can turn the screw 131 either clockwise or counter clockwise. An internet search for the phrase "twelve volt drive motor" will discover several types of twelve volt motors, which would work sufficiently well for this apparatus.

The rotation of the screw 131, due to its shape as a long threaded screw, will thus lower or raise the height of the bracket 71 and thus the exercise bar 31. The screw 131 will best be the same type of screw as typically used for industrial machines that have stepper type motors, which are designed to move individual machine components such as carriages or flat tables. The pitch of the screw 131 will best be matched to the power of the motor 36. There will best be an appropriate balance between the speed at which the motor 36 can move the bracket 71 up and down and thus the tension bar 32 up and down for the User, while also not creating undue strain on the motor 36 which would result from the selection of an inappropriate pitch of the screw 131 relative to the power of the motor 36. An incorrect matching of the pitch of the screw 131 to the power of the motor 36 would ultimately cause the motor 36 to overheat or otherwise fail to function; if for example an unduly fast pitch were selected for the screw 131. The vertical screw 131 as presently configured is an acme screw thread of one inch diameter, with a ten pitch. In the same manner, the screw pitch will best be matched to the capabilities of the manual crank 67, for those configurations that have the crank 67.

As shown in FIG. 10, the vertical screw 131 is forty eight inches long, and that length will work best for a typical User. These types of stepper motor screws are readily available from industrial vendors in extended lengths such as seventy two inches long; which will enable this apparatus to be configured with a longer vertical travel of the bracket 71 and thus the tension bar 32 and thus the exercise bar 31, as needed for a taller User.

There are a group of parts that attach the motor 36 to the screw 131. Specifically, a vertical screw upper jaw coupling hub 132 is held in a fixed position to the screw 131 by a set screw 206. The coupling hub 132 has prongs which then fit into the prongs of a vertical screw lower jaw coupling hub 134, which is also held in a fixed position relative to the screw 131 by an additional set screw 206. There is a vertical screw rubber bushing 133 which is star shaped and made from a rubbery material, which serves as a cushioning device between the coupling hubs 132 and 134. A vertical screw upper bearing 135 is mounted inside a vertical screw upper bearing housing 136.

Continuing in FIG. 10, at the bottom of the screw 131 there is a vertical screw lower bearing 138, which has a vertical screw lower bearing racer 139, which then fits into a vertical screw lower bracket 140. Both the bearing housing 136 and the lower bracket 140 have holes to allow for bolts to be inserted and tightened. Those bolts will hold the upper bearing housing 136 in position relative to the vertical column 91 and the screw 131; and will hold the lower bracket 140 in position relative to the vertical column 91 All of these parts including the coupling hubs 132 and 134, bushing 133, bearings 135 and 138, and bearing racer 139 are all readily available from industrial supply vendors. The rubber bushing 133 is available in various materials including thermoplastic elastomers; which are commonly used in applications such as automotive suspension bushings.

Figure 11:
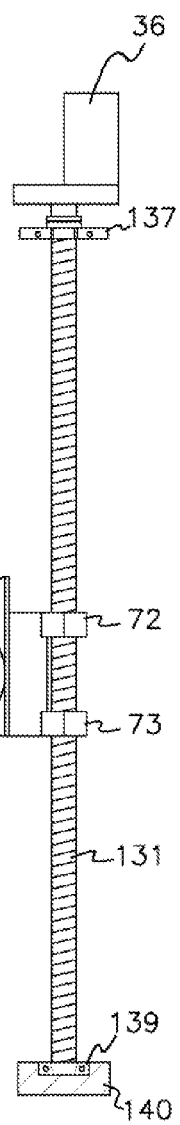
FIG. 11 is an expanded side view of the vertical screw, support bracket, and the support bracket to vertical screw connecting nuts.

FIG. 11 shows a vertical screw jaw coupling assembly 137, which includes the coupling hubs 132 and 134, rubber bushing 133, upper bearing 135, and upper bearing housing 136. FIG. 11 also shows the attachment of the bracket 71 to the screw 131. Specifically, this view shows the bracket nuts 72 and 73, which connect the bracket 71 to the column 91; such that any clockwise or counter clockwise rotation of the screw 131 will cause the bracket 71 to move up or down, which will then cause the tension bar 32 and the exercise bar 31 to move up or down. This will therefore allow the User to select the best vertical position for the bar 31 to be situated at, for optimal bodily exercise, depending on the bodily stature of the User as well as the specific exercise to be performed.

Figure 12:
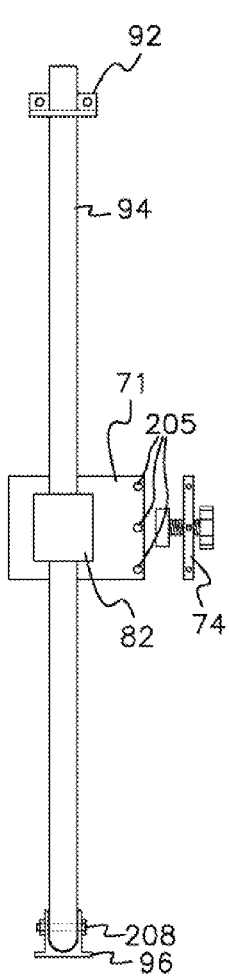
FIG. 12 is an exploded side view showing the linear bearing, support bracket and adjusting crank.

FIG. 12 shows a side view of the linear bearing rod left 94. The rod 94 is held in position by the brackets 92 and 96. There are bolts (not shown) that connect the upper bracket 92 to the column 91 (not shown); and there is a linear bearing lower bracket bolt 208 that connects the lower bracket 96 to the structural base 101. Those bolts can be of any suitable variety as available from a hardware retailer.

Figure 13:
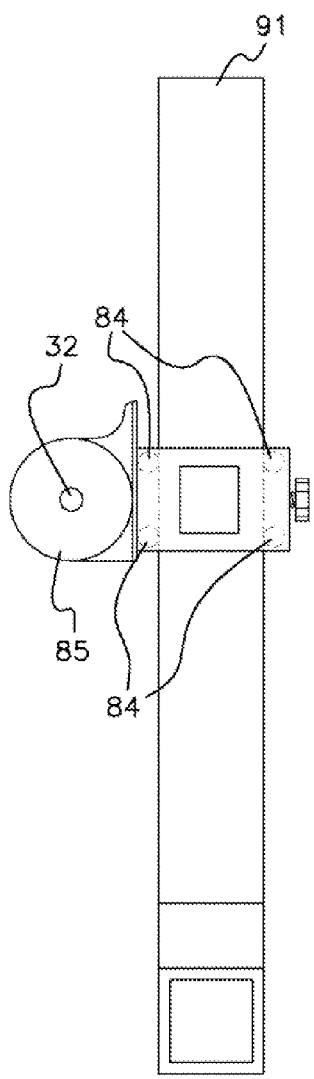
FIG. 13 is an expanded side view of the vertical column and support bracket as configured with internal roller bearings.

FIG. 13 shows a different design of the bracket 85, which will include a support bracket roller bearing 84 that will be mounted in four positions inside the double flange bracket 85; and which will ride against the column 91. The roller bearings 84 will be mounted in the double flange bracket 85 with spring inserts (not shown) so that the bearings 84 will be able to deflect slightly as the bracket 85 moves up and down against the vertical column 91.

This alternate configuration of the bracket 85 as shown in FIG. 13 will still include the access plate 74 and the knob 75 and the knob bearing 76 and the compression plate 77 (shown in FIG. 8), so that additional tension may be applied to tighten the bracket 85 with all these components, against the vertical column 91; which will be best for the User to do in cases where maximum exercise resistance levels have been selected, and the User is therefore applying significant stress to the apparatus.

Figure 14A:
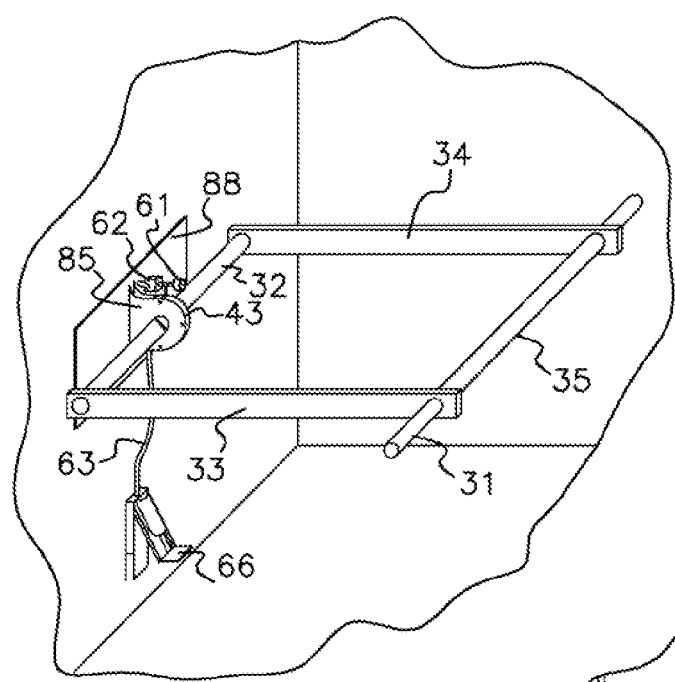
FIG. 14A shows a space saving configuration with a single resistance mechanism and the support bracket, mounted on a flat surface; with a manual air pump and the exercise bar for the User.

FIG. 14A shows a resistance mechanism mounting bracket 88 that is designed to mount the apparatus on a fixed vertical surface such as a wall. Attached to the mounting bracket 88 is the double flange bracket 85 and a pneumatically actuated resistance mechanism 43, along with the bar 32 and the connecting bars 33 and 34 and the exercise bar 31 and the sleeve 35. Additionally there is the manual air pump 66 along with the air hose 63 attached to the resistance mechanism 43, so that the User can inflate the resistance mechanism 43 with sufficient pressure for bodily exercises.

In this configuration, it will be best for the connecting bars 33 and 34 to be configured with a slightly longer bar length, so that the apparatus can be more conveniently utilized by Users with different bodily heights; given that the apparatus in this configuration will be mounted in a fixed vertical position without any option for the User to change the height of the exercise bar 31, in relation to the floor.

Figure 14B:
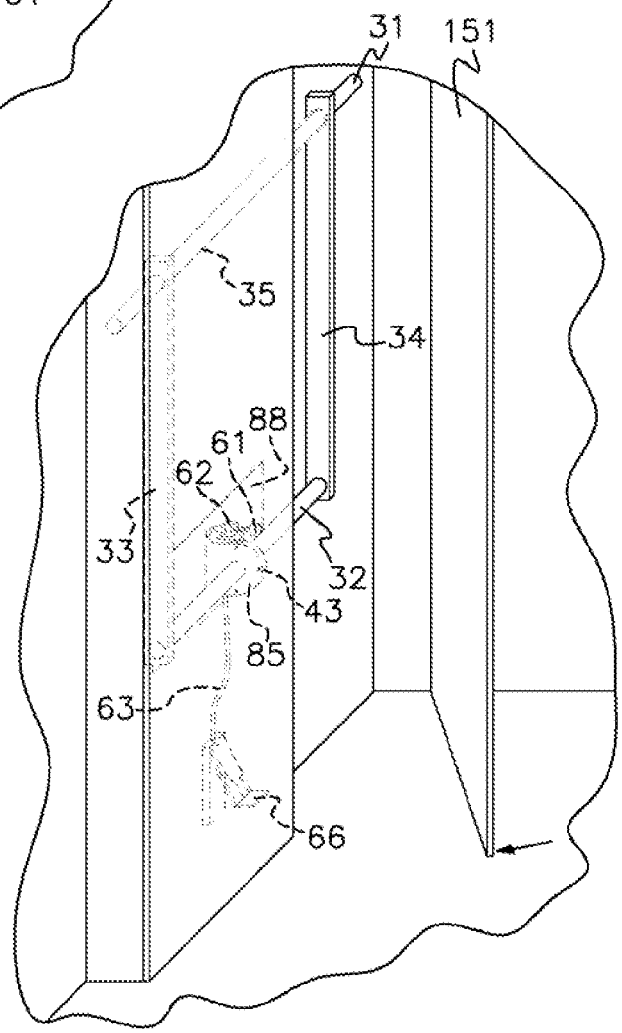
FIG. 14B shows the space saving configuration of FIG. 14A, as folded to fit inside a shallow wall recess.

FIG. 14B shows the apparatus of FIG. 14A in a folded position, to be concealed inside a shallow wall cavity.

Figure 15A:
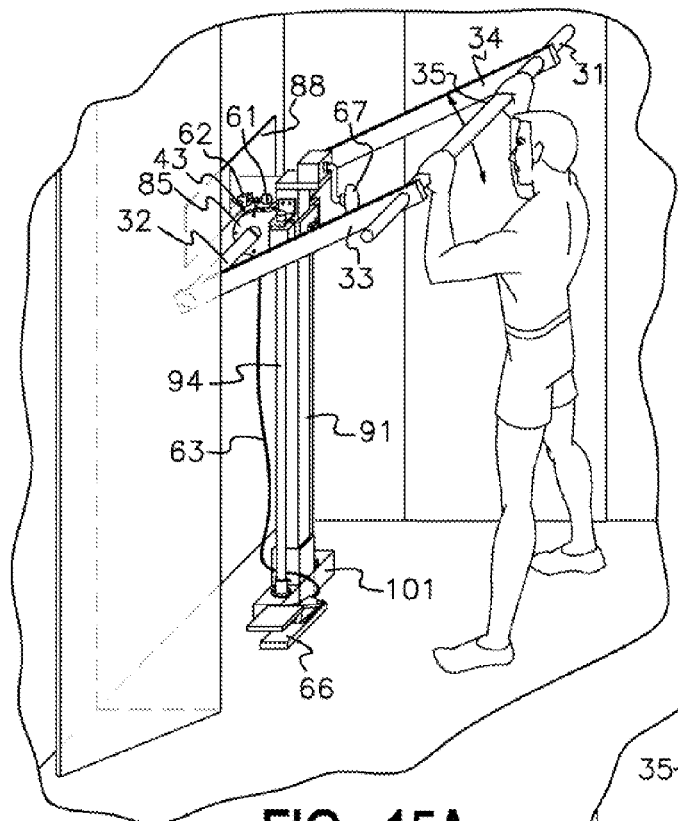
FIG. 15A shows another space saving configuration, comprised of a single resistance mechanism and the support bracket; with the vertical column and hand crank, attached to a flat surface, with a manual air pump and the exercise bar for the User.

FIG. 15A shows the resistance mechanism mounting bracket 88 and the vertical column 91, mounted inside a shallow closet. There is the structural base 101 to support the column 91, the air pump 66 to inflate the resistance mechanism 43 with sufficient pressure for bodily exercises; and the crank 67 which will be turned by the User to change the vertical height of the bracket 85, and therefore the height of the tension bar 32 and the exercise bar 31.

Figure 15B:
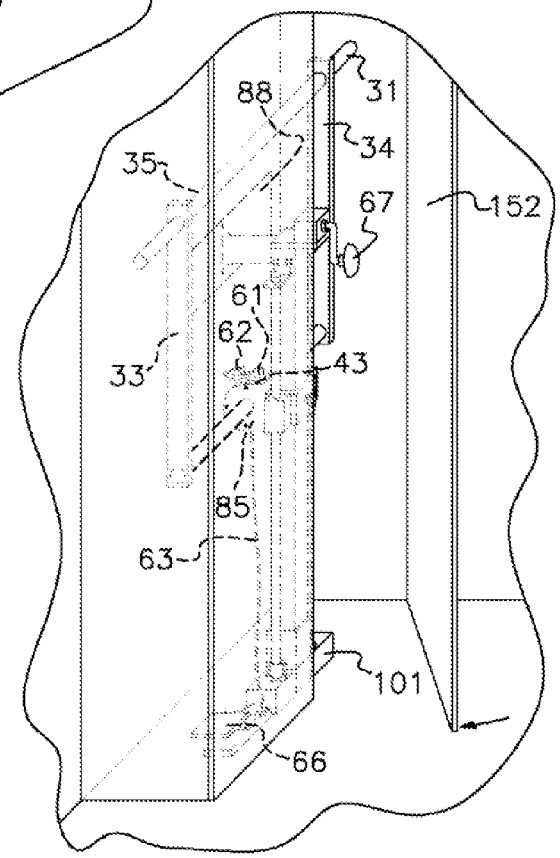
FIG. 15B shows the space saving configuration of FIG. 15A, as folded to fit inside a shallow closet.

FIG. 15B shows the apparatus of FIG. 15A in a folded position, to be concealed inside a shallow closet.

Figure 16A:
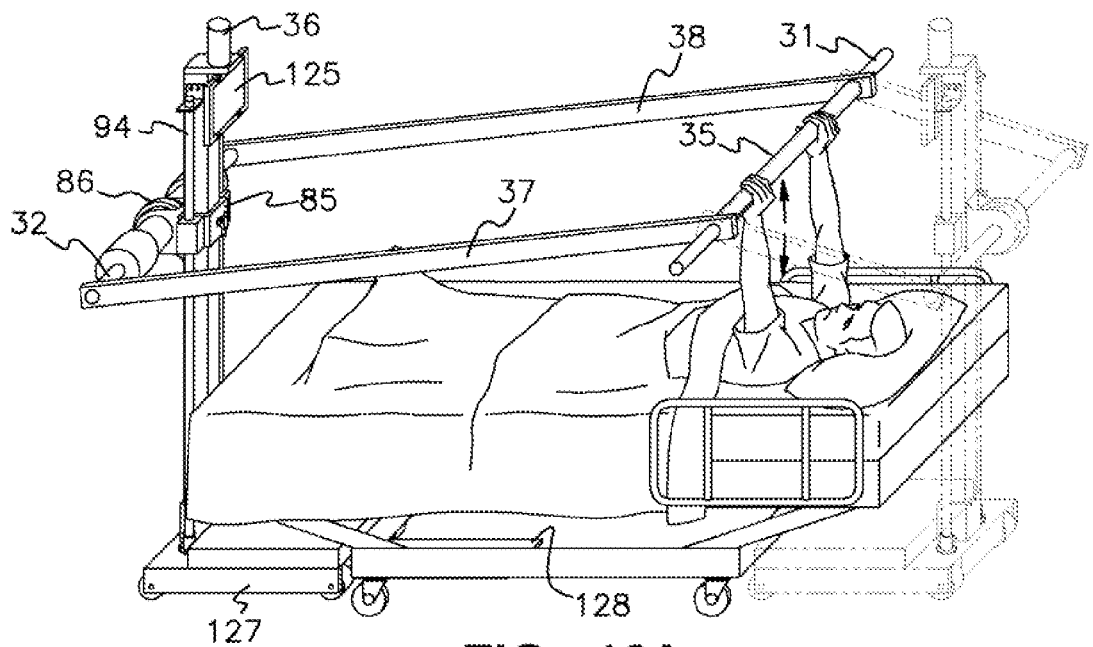
FIG. 16A shows a configuration with extended arms, a rolling base, and base extensions for stability.

FIG. 16A shows an elongated connecting bar left 37 and an elongated connecting bar right 38 and a roller base 127 and a roller base support extension 128; which allow for the apparatus to be stationed at the base of a bed such as a hospital bed. There is the torque sensing and positioning resistance mechanism 86 attached to the double flange bracket 85, and the mobile device 125 mounted to the vertical column 91 by the clips 126. The roller base 127 will best be fabricated with strong and rigid materials so that the apparatus will have sufficient stability when the apparatus is in use, and sufficient stability when being rolled from one location to another with the support extension 128 retracted.

FIG. 16A also shows a gray-scale view, to demonstrate that the apparatus can also be configured with the conventionally sized connecting bars, in which case the apparatus would be positioned at the head of the bed rather than the base of the bed.

Figure 16B:
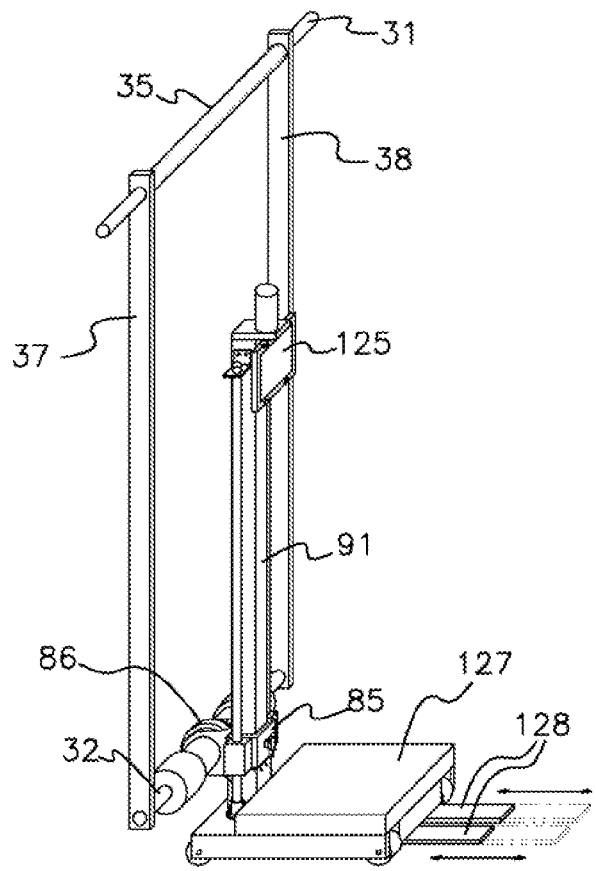
FIG. 16B shows the apparatus of FIG. 16A, with the arms raised up, ready to be moved to another location.

FIG. 16B shows the apparatus of FIG. 16A, in a retracted position with the bars 37 and 38 pointing up vertical toward the ceiling, ready to be rolled to another location.

Figure 17A:
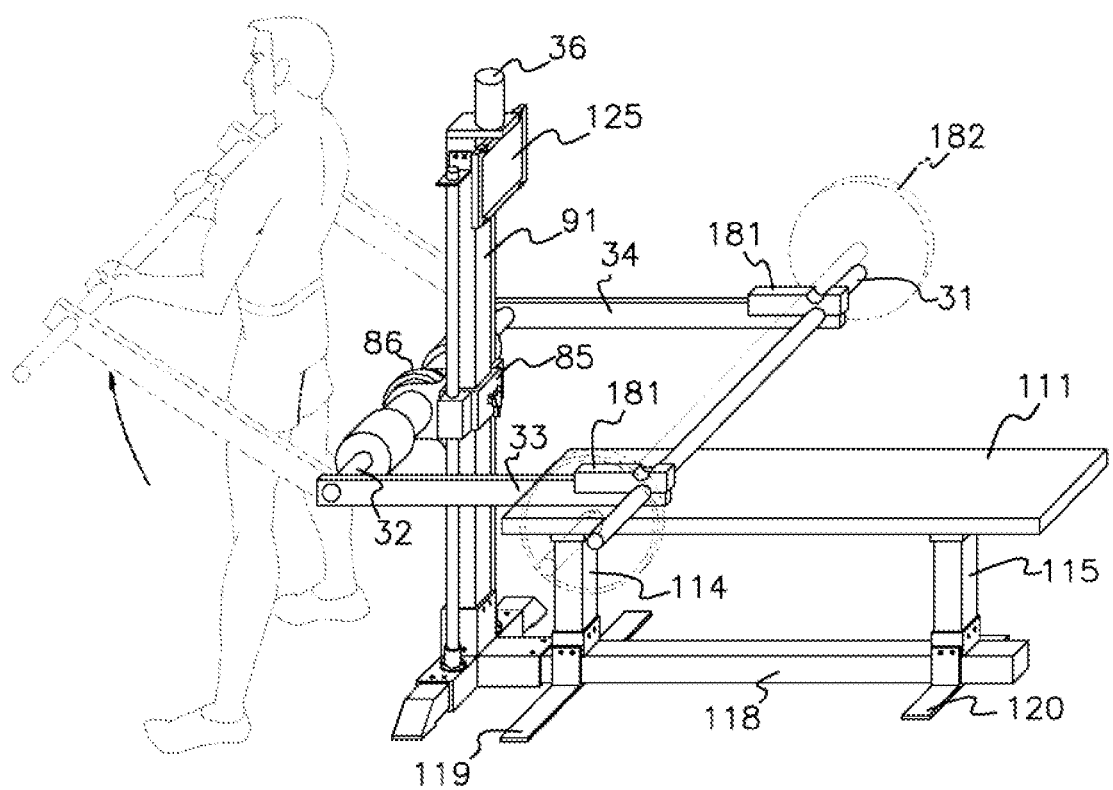
FIG. 17A shows the apparatus set up with a known quantity of free weight placed on top of the exercise bar of the apparatus, which will allow the apparatus to calibrate itself; and a human is shown in a gray scale view performing a Bicep Curl exercise.

FIG. 17A shows the apparatus set up for calibration against a known quantity of free weights. There is a free weight support bracket 181 that is shaped to fit on top of the connecting bars 33 and 34, and the exercise bar 31; such that a free weight bar 182 can be placed on top of the bracket 181 and remain in position on the exercise bar 31.

Additionally, FIG. 17A shows a gray-scale image demonstrating that the exercise bar 31 can be rotated to be positioned on the rear side of the apparatus, for the User to more comfortably perform bodily exercises in a standing position, such as the Bicep Curl as shown. This view also shows one position where the apparatus can provide isometric exercise for the User. The inherent design of the apparatus, with the bar 32 rotating within a circular resistance mechanism, thus causing the exercise bar 31 to move along a circular arc, allows the User to move the bar 31 to positions that are not possible when exercising with free weights. For example, the User can position the bar 31 such that during a Bicep Curl exercise repetition, the bar 31 will move toward the User's chest as is the case in a normal Bicep Curl exercise; and then due to the inherent design of the apparatus, the bar 31 will continue its movement in an arc going beyond the User's chest to a position that would ultimately be above the User's head. Somewhere along that arc of movement, the bar 31 will be stopped due to muscle failure of the User, and an isometric exercise will commence if the User continues to apply force to the bar 31 at that point.

Figure 17B:
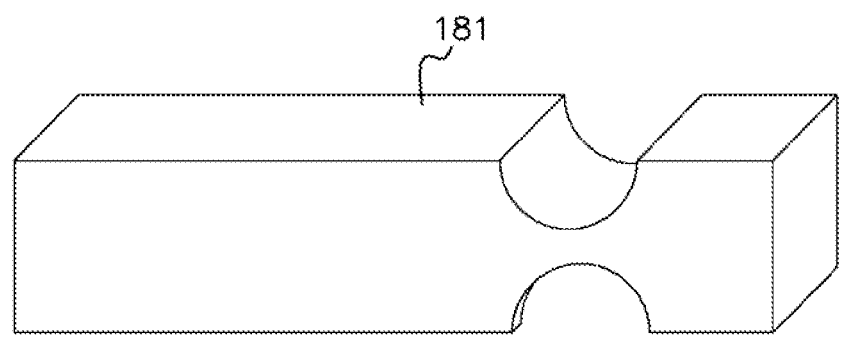
FIG. 17B is an expanded view of the free weight support bracket.

FIG. 17B shows an expanded view of the weight bracket 181. The bracket 181 has an open slot in the bottom (not shown), that is designed to be a snug fit onto the connecting bars 33 and 34.

Figure 18A:
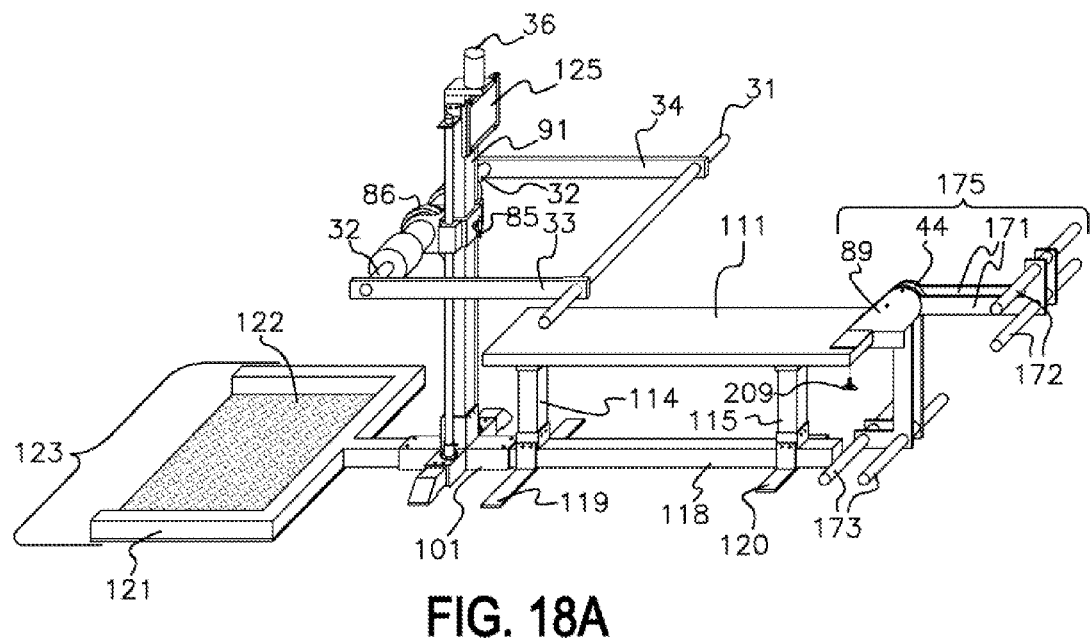
FIG. 18A is a side view of the apparatus, as configured with a mobile device, magneto elastic torque sensors, electro magnetic particle brakes, and stepper motor; as well as a leg extension station mounted on the far end of the bench, and a Dead Lift station to the left of the vertical column.

FIG. 18A shows the apparatus as set up to allow for numerous different exercises, with the addition of a dead lift station 123 and a leg extension station 175. Starting from the left, there is the dead lift station 123 which has a dead lift platform 122 and a dead lift floor beam 121. The platform 122 is best included, so that the User will stand on the platform 122 while performing the Dead Lift exercise, which will prevent the apparatus from being lifted off the floor. A particularly strong User who has selected a very high resistance level, would be able to lift the apparatus up off the floor instead of moving the exercise bar 31, if the dead lift platform 122 was not present. Alternatively or additionally, it may be best to bolt the apparatus to the floor, if the Users location allows for that; especially in cases where Users will be selecting a very high resistance force from the apparatus.

On the right side, the leg extension station 175 is attached to the bench 111 by a leg extension mounting bracket 89, which is tightened in position by a leg extension mounting bracket bolt 209. A leg extension resistance mechanism 44 is mounted on the bracket 89, to provide exercise resistance to the User. There is a leg extension ankle bar upper 172 and a leg extension ankle bar lower 173, which are positioned so that a User can perform a leg extension or a leg curl bodily exercise.

Figure 18B:
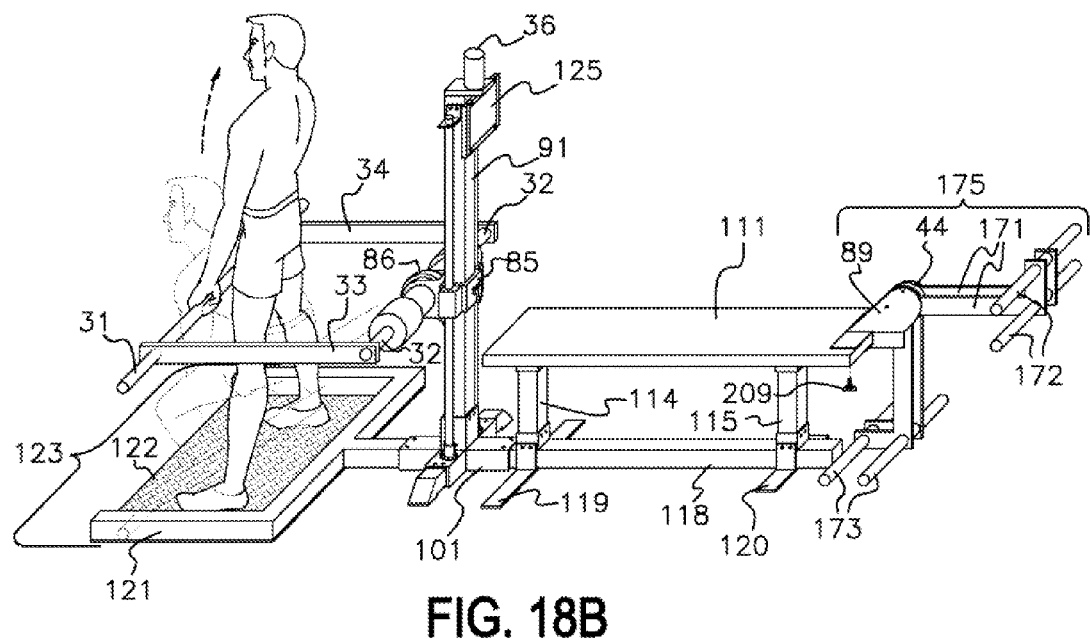
FIG. 18B is the same view as FIG. 18A, with the addition of a human, to show the Dead Lift exercise being performed.

FIG. 18B is the same view as FIG. 18A, with the addition of a human User shown performing the Dead Lift exercise. This view can also serve as a perspective to evaluate the exercise force generating capability of the apparatus. In this configuration as shown, within the mechanism 86 there are two of the brakes 48, one on either side of the stepper motor 40. An Internet search for the term "maximum torque rating for electro magnetic particle brake" will discover various OEM manufacturer sites, which will have model sizes with torque ratings. A typical maximum torque rating for an Electro Magnetic Particle Brake that is approximately ten inches in outer diameter, as disclosed by various manufacturer web sites, is six thousand inch pounds of torque.

This apparatus therefore allows for a mathematical calculation as to what actual exercise resistance is available to the User. For example: if the bars 33 and 34 are a typical length of thirty six inches, then a torque calculation based upon a resistance mechanism torque rating of three thousand inch pounds, will yield the conclusion that two of the brakes 48, when energized at their maximum torque rating, will generate over one hundred fifty pounds of exercise resistance, as applied to the User, while the User is grasping the exercise bar 31 at a distance of thirty six inches from the brakes 48.

Further, it would be possible to achieve an exercise resistance force to the User of over five hundred pounds, as measured at the bar 31 that the User is in contact with, by utilizing larger sized resistance mechanisms available from OEM manufacturers; or by including additional pairs of resistance mechanisms mounted to the bracket 85, as needed or appropriate for bodily exercise by athletes and other particularly strong Users. However, for the vast majority of consumer type Users, who are not professional athletes or bodybuilders, any resistance above one hundred fifty pounds of actual force to the User as measured at the exercise bar 31, will be more than adequate for long term bodily improvement and maintenance.

Figure 18C:
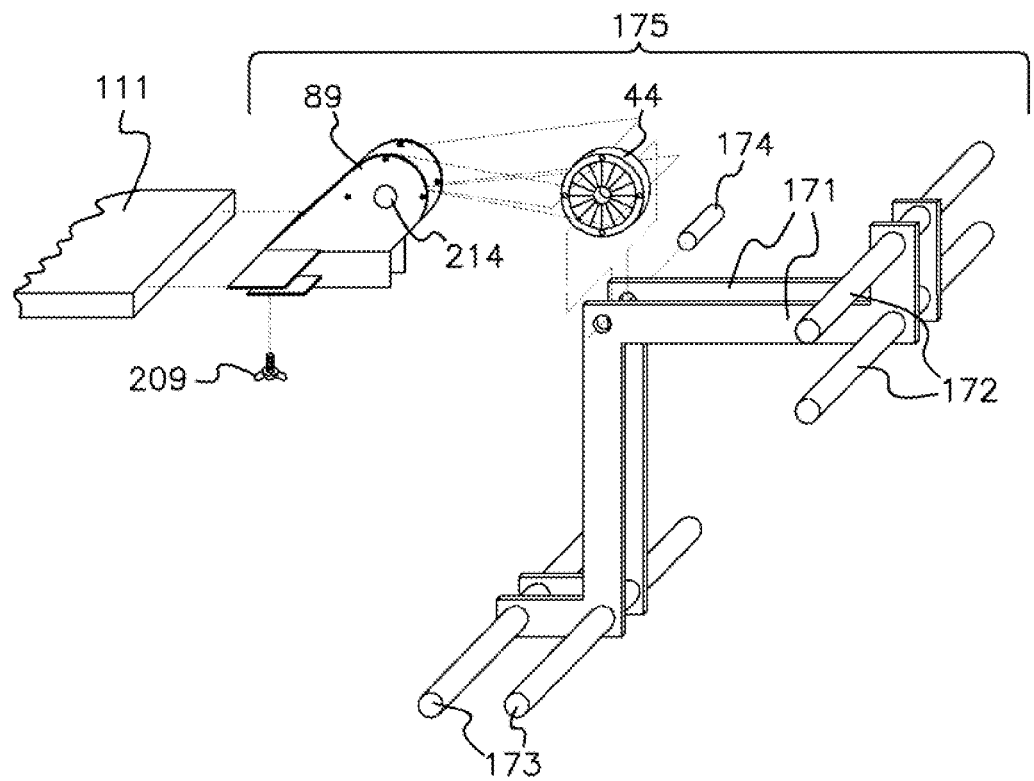
FIG. 18C is an exploded side view of the leg extension assembly.

FIG. 18C shows an exploded side view of the leg extension station 175. The mounting bracket 89 allows the leg station 175 to be attached to the bench 111, with the resistance mechanism 44 mounted within the leg extension mounting bracket 89. The ankle bars 172 and 173 are configured with a double bar for each, so that the User can push the apparatus back to the starting position when performing a physical exercise.

The best type of resistance mechanism to utilize in this configuration will depend on several factors, and could be a pneumatically actuated resistance mechanism such as seen in FIG. 7A, or an electric resistance mechanism as seen in FIG.

7B. That final determination will have to be made in discussion with the ultimate User or expected Users of the apparatus, so that the resistance mechanism attached to the leg extension mounting bracket 89 will be a proper fit for their budget and physical exercise needs.

Figure 18D:
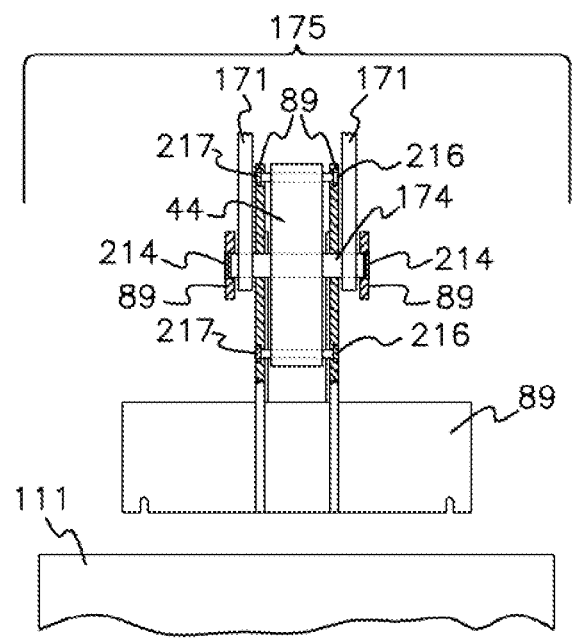
FIG. 18D is an expanded top view of the leg extension assembly.

FIG. 18D shows an expanded top view of the leg extension station 175. The mounting bracket 89 includes four vertical plates: two each on the left side of the resistance mechanism 44 and two each on the right side of the resistance mechanism 44, which allow a leg extension beam 171 to move while the leg extension resistance mechanism 44 remains stationary. This design also allows for movement of the beam 171 without the beam 171 rubbing against or touching the User's legs. There is a leg extension tension bar end cap 214, that keeps a leg extension tension bar 174 properly in position. The bar 174 passes through the resistance mechanism 44 and also through the flanges of the bracket 89. There is a leg extension resistance mechanism bolt 216 and a leg extension resistance mechanism nut 217, that hold the resistance mechanism 44 in place in the bracket 89.

All of the variations described above, as shown in FIG. 1 through FIG. 18D, are shown without any safety coverings on the apparatus. In normal operation it will be best to have safety coverings such as rubber grips or foam cushions (not shown), on all exposed ends including but not limited to: the ends of bar 31, the ends of bars 33 and 34, the ends of the bars 172 and 173, the edges of the brackets 92 and 93, and possibly the edges of the bench 111. Additionally, it will be best to have stickers on the apparatus, such as a label to read: "Do not leave exercise bar in a horizontal position. This bar should be all the way up or down when not in use."

Configurations & Operation of the Apparatus

The operation of the subject apparatus will vary depending on the configuration; and the best configuration of this apparatus will depend on the financial budget, the physical space available, the bodily stature, and the objectives of the User.

There are several configurations of the apparatus shown in the drawings. In addition, there are numerous possible sub-configurations and alternate variations that are not shown. The basic configurations as shown are:

Wall mounted, manually operated.

As shown in FIGS. 14A and 14B, the apparatus is best configured for a User who has very limited space to mount the apparatus. This will also be the best configuration to be used as an exercise station in public places such as at the beach or along the length of a community running path.

In this configuration, the apparatus consists of just the pneumatically actuated resistance mechanism 43, the air pressure gauge 61 and the air release valve 62, the bracket 88 which allows the apparatus to be mounted on a vertical surface, along with the exercise bar 31 and the sleeve 35 and the connecting bars 33 and 34, and the tension bar 32.

The apparatus as configured is inherently quiet. The only action of the apparatus that can create any sound will be the movement of the disc 52 against the hub 51; and any one repetition of any typical exercise movement will only cause the disc 52 to rotate approximately forty five degrees, against the hub 51. As a result, there is not enough movement or friction to create any decipherable level of sound.

This configuration will include the air pump 66 and the air hose 63, and there may also be a set of doors for concealment including a wall cavity door 151, if the User has chosen to mount the apparatus inside a shallow wall recess. In this configuration it will be best for the User to make careful note of the bodily height of the User or Users who will be performing bodily exercises on the apparatus. Based on the typical or average bodily height of all possible Users, the mounting bracket 88 will then be placed at the appropriate vertical height on the wall such that the height of the exercise bar 31 will be at the most comfortable or practical height for all Users. In this configuration the User can perform bodily exercises including but not limited to: Bicep Curl, Wrist Curl, Tricep Pushdown, Bench Press, Incline Press, Shoulder Press, Lat Pulldown, Dead Lift, and Squat. In this configuration, some of these bodily exercises will best be performed with a bench for the User to lie down on or stand on.

To operate the apparatus in this configuration, the User will open the shallow wall recess doors if there are any, and step repeatedly on the air pump 66 until the air pressure as indicated by the gauge 61 is sufficient for the next exercise that the User wishes to perform. The User will then proceed to perform as many repetitions as desired of a bodily exercise at that level of resistance. To increase the exercise resistance, the User will step additional times on the pump 66, while watching the pressure as indicated by the gauge 61. To decrease exercise resistance, the User will open the valve on the release valve 62, which will release air pressure from the resistance mechanism 43, which will decrease the exercise resistance of the apparatus as applied to the User.

When the User has completed their exercise routine, they will open the valve on the release valve 62 in order to release all air pressure from the resistance mechanism 43, which will cause the bar 31 to fall down to the floor. At that point the User will fold up the bar 31 and the connecting bars 33 and 34 to be either flat on the wall with the bar 31 nearest the floor; or alternatively if the length of the connecting bars 33 and 34 are too long for the bars to be folded flat on the wall toward the floor; then the User will raise the bars 33 and 34 and the bar 31 to be in a fully vertical position as shown in FIG. 14B. There would ordinarily be a clip of some sort (not shown), supplied with the apparatus so that both the bar 31 and the pump 66 can be held by the clips in a totally closed or flat configuration, so that the apparatus will be able to fit in the most shallow wall cavity. Once the air pressure has been fully released and the apparatus folded totally flat, the User can close the wall cavity doors and hide the apparatus from view.

Wall mounted, with vertical column, manually operated.

As shown in FIGS. 15A and 15B, the apparatus is best configured for a User who has limited space where they can place the apparatus, but who also needs to perform a wider range of bodily exercises; or who has numerous Users all needing to perform bodily exercises on the same apparatus. In this configuration, the apparatus is the same as shown in FIG. 14A, with the addition of the column 91, the structural base 101, the rods 94 and 95, and the adjustment crank 67. In this configuration, there may also be a set of doors for concealment including a shallow closet right side door 152, if the User has chosen to mount the apparatus inside a shallow closet. In this configuration the User can perform bodily exercises including but not limited to: Bicep Curl, Forearm Curl, Tricep Pushdown, Bench Press, Incline Press, Shoulder Press, Lat Pulldown, Dead Lift and Squat.

The operation of the apparatus in this configuration is the same as for that in FIG. 14A outlined above, with the addition of the crank 67. The User can turn the adjustment crank 67 which will cause the bracket 85 and the bar 31 to move up or down, to place the exercise bar 31 at the optimal vertical height for the next desired bodily exercise to be performed. The User will follow the same procedure as outlined above in FIG. 14A, to change the amount of resistance force for each desired bodily exercise, and to fold back up the apparatus when concluded. There would ordinarily be a clip of some sort (not shown), supplied with the apparatus so that the exercise bar 31 can be held by the clip in a totally closed or flat configuration, so that the apparatus will be able to fit in a shallow closet, with the bar 31 and the connecting bars 33 and 34 all held in a stowed position.

With bench and vertical column, manually operated.

As shown in FIG. 1 and with reference to FIG. 2A-C and FIGS. 5 & 6, the apparatus is best configured for a User who wants to be able to perform a complete range of bodily exercises, and who has sufficient space for an apparatus that will not be easily concealed, and who needs to place the apparatus at some location such as a vacation cabin where there is permanently no electricity. Alternatively this could include placement of the apparatus inside of a storage shed or workshop behind the User's house, where there is no electrical power available. The apparatus would thus be configured as seen in FIG. 1, with the substitution of the crank 67 in lieu of the motor 36, and with addition of the air pump 66, the gauge 61, and the release valve 62.

The operation of the apparatus in this configuration is the same as described above for FIG. 15A; the only difference being the lack of any need to fold up the exercise bar 31 when finished with bodily exercises, as this configuration is not meant to be space saving or concealable. However, in this configuration, for safety reasons, the User should return the bar 31 to a fully lowered position when their exercise session is concluded, to avoid any risk of a person walking into the bar 31.

With bench and vertical column and air compressor.

As shown in FIG. 1 and FIG. 2A-C and FIG. 3, the apparatus is best configured for a User who wants to be able to perform a complete range of bodily exercises, and who has sufficient space for a larger apparatus that will not be readily concealed, and who needs for the apparatus to be capable of moving faster when changing to different exercises or additional exercise sets at different resistance levels. This would also be the best configuration for Users with diminished bodily strength, such as a physical injury or other bodily limitation. The apparatus would thus be configured as seen in FIG. 1, with addition of the pressure gauge 61, the valve 62, the compressor 64, and the battery box 65.

As noted above in the Detailed Description, the battery box 65 will contain either a twelve volt battery or a one hundred and ten volt to twelve volt transformer; either of which is for the purpose of powering the air compressor. The twelve volt battery will be best for use of the apparatus at any location where power may be intermittent, or for use of the apparatus in a mobile configuration such as mounted on a trailer to be transported to a beach or recreational area for a limited duration of bodily exercises. The one hundred ten volt to twelve volt transformer will be best for use of the apparatus at a location where there is permanent and reliable electrical power available.

To operate the apparatus in this configuration and referring to FIG. 3, the User will turn on the compressor 64 by way of the toggle switch on the toggle switch panel 90, which will cause the air pressure in the resistance mechanisms 69 and 70 to be increased, which will result in a higher resistance force for the exercises being performed by the User. The User should watch the air pressure as indicated by the gauge 61 while the compressor 64 is running, to achieve the desired amount of air pressure and therefore exercise resistance as desired, at which point the User will turn off the compressor 64. To decrease exercise resistance, the User will open the valve on the air release valve 62, which will release air pressure from the resistance mechanisms 69 and 70, which will decrease the exercise resistance of the apparatus as applied to the User.

With bench and vertical column, and electric resistance mechanism.

As shown in FIG. 1 and FIG. 2A-C and FIG. 7B and FIG. 7E-F, this configuration will utilize an electric resistance mechanism that is mounted substantially symmetrically on the tension bar 32. This configuration is best for a User who desires a more accurate repeatability of exercise resistance levels from one exercise session to the next, or who has particular need for the voice activated control of this configuration of the apparatus. Examples would include a User with physical handicaps, injuries or other conditions causing a decrease or limitation of bodily strength; for whom the voice control will be particularly convenient. The apparatus in this configuration is inherently quiet. The only components in this configuration that will move, as a User performs a repetition of a physical exercise, will be the internal parts of the electric resistance mechanism 45. However, any one repetition of any standard exercise movement will only cause the resistance mechanism 45 to rotate approximately forty five degrees. As a result, there is not enough movement of the internal parts of the resistance mechanism 45 to create any noticeable level of sound.

To operate the apparatus in this configuration, the User will interact with the voice recognition module 124, to give verbal commands to the apparatus. Those verbal commands will control both the amount of exercise resistance to be applied by the apparatus to the User for the next bodily exercise to be performed, as well as to direct the apparatus as to what height the tension bar 32 should be positioned at to perform the next bodily exercise.

The User will turn on the apparatus by flipping an On-Off switch (not shown), and then will speak basic commands to the voice module 124. For example: a command of "bar up" will cause the bar 32 to be moved up a preset distance. A command of "bar down" will cause the bar 32 to be moved down a preset distance. A command of a specific number of pounds such as "fifty pounds" or "one hundred pounds" will cause the resistance mechanism 45 to set that amount of exercise resistance to be delivered to the User. A command such as "down five" or "up ten" will cause the resistance mechanism 45 to change the exercise resistance delivered to the User by that amount.

With elongated bars for bedridden Users.

As shown in FIG. 16A-B, another configuration of this apparatus would be best for a hospital or physical therapy center, where there are patients who are not fully ambulatory, who will benefit from physical exercise. In this configuration the apparatus will include the elongated connecting bars 37 and 38, which will enable the User to perform a variety of bodily exercises while confined to a bed. Either the User or a health care professional would interact with the mobile device 125 to give verbal commands to the apparatus; to control both the amount of exercise resistance to be applied by the apparatus to the User for the next bodily exercise to be performed, as well as to direct the apparatus as to what height the tension bar 32 should be positioned at to perform the next bodily exercise.

In this configuration the apparatus will additionally have the roller base 127 as shown in FIG. 16B, as well as two extensions 128; such that the apparatus will have sufficient stability when a User is lying horizontal in a bed and performing bodily exercises with the apparatus. When the exercise session is completed, the apparatus can be returned to a movable configuration as shown in FIG. 16B, whereby the bars 37 and 38 and the exercise bar 31 will be raised into a vertical position; to allow for the apparatus to be rolled from room to room within a hospital or other health care setting.

With torque sensing electric resistance mechanism.

As shown in FIG. 18A-D, the apparatus is best configured for a User who wants to be able to perform numerous different bodily exercises with just one apparatus, and be able to control the apparatus by voice commands, and who has a sufficient area to set up the apparatus with reasonable space around the apparatus for access, and has sufficient financial budget to invest in the apparatus, and who wishes to have an apparatus that can perform the tasks otherwise requiring a human spotter, and who desires a highly accurate repeatability of exercise resistance levels from one exercise session to the next, and wishes to be able to calibrate the apparatus against a known quantity of weight in pounds.

Examples of this type of User would include professional athletes and bodybuilders who need to know exactly what progress they are making from one exercise session to the next, or persons recovering from bodily injuries such as bone fractures, who need to know exactly what improvements they are making over time; as well as hospitals and physical therapy centers where there is a need to for an apparatus that can provide effective exercise for a wide range of body types and bodily capabilities, with a high degree of accuracy and repeatability.

In this configuration, the User can perform a wide variety of bodily exercises with the apparatus, including but not limited to: Bicep Curl, Wrist Curl, Tricep Pushdown, Tricep Curl, Shoulder Press, Lat Pulldown, Bench Press, Incline Press, Dead Lift, Squat, Calf raise, Leg Extension, Leg Curl, Neck Press, and Abdominals.

In this configuration it will be best to bolt the apparatus to the floor, due to the high amounts of resistance that will likely be selected by the Users. If the apparatus is not bolted to the floor or otherwise secured, then the front side of the apparatus may be tilted off the ground, for example, when a User is standing on the rear side of the apparatus and performing an exercise movement that requires the bar 31 to be pushed downward toward the floor.

This configuration will include voice activated controls. However, as noted above in the Detailed Descriptions, the voice recognition module 124 will be accurate at recognizing a variety of human voices, but it will not be infallible; and therefore this configuration as shown in FIGS. 18A and 18B will include the mobile device 125 for voice recognition. The mobile device 125 would be much more accurate, as the User would initialize the device 125 to recognize their own voice; as compared to the voice recognition module 124, which comes preset from the manufacturer to recognize a variety of human voices.

The User will turn on the apparatus by flipping an On-Off switch (not shown), and then will speak basic commands to the mobile device 125.

For example: a command of "bar up" will cause the bar 32 to be moved up a preset distance. A command of "bar down" will cause the bar 32 to be moved down a preset distance. A command of a specific number of pounds such as "fifty pounds" or "one hundred pounds" will cause the resistance mechanism 86 to set that amount of exercise resistance to be delivered to the User. A command such as "down five" or "up ten" will cause the resistance mechanism 86 to change the exercise resistance delivered to the User by that amount.

For applications where a User desires a more complex workout that fully taxes the muscles as repetitions are performed, this configuration includes the magneto elastic torque sensor 47 units. The sensor 47 allows the apparatus to vary the exercise resistance delivered to the User, in response to the amount of force being applied by the User to the apparatus.

To operate the apparatus in this configuration, the User will speak the command "spotter" to the mobile device 125. During the following exercise repetitions, the torque sensor 47 units will sense the actual force being delivered by the User to the apparatus, regardless whether the User is turning the tension bar 32, or if the bar 32 may be stationary while the User is straining to move it any further. If at anytime the force as applied by the User to the apparatus falls below the level of resistance force selected by the User for that exercise, the apparatus will then lower the exercise resistance by a preselected amount. To cancel this feature, the User will speak the command "cancel."

This configuration also includes the stepper motor 40, which allows the User to perform a very fast paced workout, without the assistance of a human spotter. The motor 40 will allow the apparatus to very quickly move the tension bar 32 and therefore the exercise bar 31, to the opposite side of the column 91. For example, if the User is performing a Bench Press and then wishes to quickly proceed to a standing Bicep Curl, then the exercise bar 31 needs to be moved from the front side of the apparatus where the Bench Press is typically performed, to the rear side of the apparatus where the standing Bicep Curl is typically performed. To accomplish this, the User will speak the command "bar rear" or "bar front" to the mobile device 125, which will send a signal to the solid state control device 49, which will send a signal to the motor 40, causing the motor 40 to rotate the bar 32 and therefore the exercise bar 31 to the desired position. However, for safety reasons, it will be best to have a built in safety device integrated with the motor 40, so that the movement of the exercise bar 31 will be interrupted if any obstruction such as a human body, is in the way of the movement of the bar 31 or the bars 33 and 34.

An additional feature of this configuration as shown in FIGS. 18A and 18B is that, with the addition of the stepper motor 40 in combination with the mobile device 125 and the solid state control device 49, this apparatus can respond to a verbal command from the User at the instant that the User is experiencing physical strain or exhaustion, and is unable to move the exercise bar 31 any further. At that instant it may likely be the case that the User needs just a slight change in the position of the exercise bar 31 in relation to the body of the User, to continue with that particular repetition. For example, the User could say the words "move up" or some other appropriate phrase such as "turn one" and the apparatus will react by sending a signal to the stepper motor 40, to cause it to turn a preselected amount such as a twenty degree rotation of the exercise bar 31 in relation to the column 91. This is a very useful capability, as it is often the case that a User, when straining to complete a repetition, does not need to reduce the resistance force, but rather simply needs to slightly change the position of their arms or legs, to then be able to continue and complete that repetition with the same amount of resistance force as had been initially selected.

An additional feature of this configuration, as shown in FIG. 17A-17B, is the capability of the apparatus to calibrate itself. For dedicated weightlifters such as professional bodybuilders and professional athletes, it is very desirable to know precisely what amount of actual weight is being utilized for any particular bodily exercise. It is for this reason that many athletes and bodybuilders will only exercise with free weights, since a free weight with the exact poundage clearly indicated, allows the User to see precisely what amount of actual weight they are exercising against. This apparatus in this configuration, will provide the User with that same capability.

To calibrate the apparatus against a known quantity of free weights, the User will speak the command "calibrate" to the mobile device 125, which will cause the two brake units 48 to lock up and hold the bars 33 and 34 in a position parallel to the floor. The free weight bar 182 loaded with one hundred pounds of total weight will then be placed on top of the bar 31, as shown in FIG. 17A. The User will then speak the command "one hundred," and the magneto elastic torque sensor 47 and the particle brake units 48 working together, will detect the force being applied by the free weights to the bar 31 and thus to the tension bar 32. The torque sensor 47 will send a signal to the control device 49, which will cause the control device 49 to calibrate itself against that weight.

When calibrated by this process, the apparatus will have a high degree of accuracy; such that the resistance force applied to the User by the apparatus will be substantially equal to the exercise resistance that the User would experience with that same quantity in pounds, of free weights.

This configuration as shown in FIGS. 18A and 18B also includes the dead lift station 123, which allows the performance of a standard Dead Lift exercise. To activate the dead lift station 123, the User will speak a command such as "Dead Lift" which will cause the stepper motor 40 and the drive motor 36 to turn as needed to move the connecting bars 33 and 34 and the bar 31 to the rear of the machine with the tension bar 32 situated at approximately thirty inches from the platform 122. In this mode, there will be extra functionality of the apparatus applied by the solid state control device 49, such that the force applied to the User while the User is moving from a fully upright standing position back down to the fully bent position nearest the platform 122, will be no more than the User's body weight. This is necessary as otherwise the User's feet would be lifted off the floor, rather than the bar 31 being returned to its lowest position near the floor, if the force applied to the User by the apparatus when moving the bar 31 from its highest position during the Dead Lift exercise, back to its lowest position, were more than the bodily weight of the User.

Additionally, if the User gives a verbal command of "Squat" to the apparatus, to perform a standard Squat movement, then the apparatus will include extra functionality; such that the force applied to the User while the User is moving from a fully upright standing position back down to the fully bent position nearest the dead lift platform 122, will be no more than the User's bodily weight. This is necessary as otherwise the Users feet would be lifted off the floor, rather than the exercise bar 31 being returned to its lowest position near the floor—if the force applied to the User by the apparatus on the return or lowering stroke of the Squat exercise movement were more than the bodily weight of the User.

This configuration will also include the support bracket roller bearing 84 (shown in FIG. 13). The bearing 84 will afford a smoother movement of the double flange bracket 85 along the length of the column 91.

As shown in FIG. 18C-18D, in this configuration the apparatus will also include the leg extension station 175; which has the leg extension resistance mechanism 44, as well as the leg extension beam 171, the leg extension ankle bar upper 172, and the leg extension ankle bar lower 173, and the mounting bracket 89. To operate the apparatus in this configuration with the ankle bar 173, the User will sit on the bench 111 with their back toward the column 91, and place their ankles between the two bars of the extension bar 173; such that the User's legs are in roughly a ninety degree bent position. Each repetition will be conducted by straightening the legs and then returning the legs to the ninety degree bent position.

To operate the apparatus using the ankle bar 172, the User will lie down with their chest flat on the bench 111, and place their ankles between the bars of the leg extension bar 172. Each repetition will be conducted by bending the legs to a ninety degree position, and then returning the legs to a substantially straight position.

And, because this apparatus applies resistance force to the User in both directions for each exercise movement, the second bar on the leg extension ankle bars 172 and 173 is needed so that the User's ankle or foot will push the beam 171 back to the starting position when performing each repetition. Otherwise the beam 171 would remain in an upright position rather than a lowered position and the User would not be able to begin the next repetition.

All configurations.

The maximum exercise resistance capability of the apparatus, in any configuration, can be accurately matched to the expected User or Users, by way of the torque rating specified by the manufacturers of the various resistance mechanisms that this apparatus can be configured with. As a result, a wide range of exercise resistance capabilities can be offered in different configurations of the apparatus, without the need for all Users to purchase a robustly configured version of the apparatus, that would have considerably more exercise resistance force capability than they would ever need. For example, a person recuperating in a health care facility may only require a maximum exercise resistance of fifty pounds, and in contrast, a professional power lifter may need a total resistance capability of five hundred pounds or more. It would be impractical or economically undesirable for any User, to purchase an exercise apparatus that has a range of exercise resistance force that is considerably lower or higher than the User's actual bodily needs and capabilities.

The ability to source a resistance mechanism from an OEM manufacturer, with a known and specific maximum torque rating for each resistance mechanism as configured, to be featured on multiple different versions of the apparatus tailored to specific needs, is most desirable for the ultimate User. Further, for potential future yet unanticipated applications, such as future individuals who may appear having extraordinary strength, it will be possible to fabricate versions of the apparatus that can provide tremendous amounts of exercise resistance at the exercise bar 31, such as one thousand pounds of resistance or even two thousand pounds of exercise resistance at the bar 31. In that case, it will be best for the apparatus to be constructed from reinforced or suitably modified components, to withstand the forces exerted by such future extraordinary Users upon the apparatus.

Additional Embodiments of the Apparatus

In addition to those mentioned above, there are other possible configurations of the apparatus, or alternative designs that can be utilized for the various components. These include but are not limited to the following:

As shown in FIG. 1 the apparatus includes the exercise bar 31, the connecting bars 33 and 34, and the tension bar 32. All of these bars can be made from any number of different materials or shapes (not shown), including but not limited to: special alloys or compositions for the tension bar 32 so that any torque sensors present in the apparatus will perform maximally, or telescoping bars and curved bars for Users with special bodily needs, and titanium or other materials for maximum strength.

As shown in FIG. 1, the exercise bar 31 is a straight bar. Alternatively, the apparatus may include various configurations of bars (not shown) shaped for particular exercises or special bodily needs; as well as any manner of hand attachments for special exercises or special bodily needs, And, there may be any variety of attachments (not shown) to the exercise bar 31 or the connecting bars 33 and 34, or the column 91, to facilitate particular exercises such as the Dead Lift, Neck Press, or Forearm Curl; where specialized attachments will allow the User to achieve the maximum benefit of the exercise. Additionally, there may be attachments for the User's feet, or lower body, or upper body, such as straps with hook and loop attachments, to allow the User to remain in a fixed position while performing various exercises.

As shown in FIG. 1, the drive motor 36 is a twelve volt electric motor. Alternatively, an air actuated motor could be used, so that a User who already has an air compressor, can power the entire apparatus using an external air compressor (not shown).

As shown in FIG. 1, the apparatus has one vertical column 91. The apparatus could include an additional column 91 situated in a horizontal position, either above the bench 111 or below the bench 111 or both, to allow for additional bodily exercise movements. The horizontal configuration of the column 91 would allow for additional bodily exercises that would be of particular benefit to athletes such as baseball players, tennis players, swimmers and Olympic rowers.

As shown in FIG. 1, the apparatus has one of the bracket 71, along with the single exercise bar 31. Alternatively the apparatus could include additional brackets 71 mounted to the column 91, along with additional sets of bars 31 and 32 and 33 and 34; such that there would be more than one exercise bar 31 for the User to select from, to achieve the most efficient or effective bodily exercises.

As shown in FIG. 2A, the bench 111 may include an equipment box (not shown) mounted under the bench 111 to hold the weight bracket 181 and other parts such as the specialized bar or hand attachments mentioned above.

As shown in FIG. 2A, the exercise bar 31 and the connecting bars 33 and 34 are typically solid bars made from a common material such as aluminum. Alternatively, the bar 31 or the connecting bars 33 and 34 may include finger tip controls or foot controls (not shown), that may include wires, switches, or other such devices positioned inside the bars or outside the bars 31 and 33 and 34; so that the User can change any of the settings or positions or exercise resistance levels of the apparatus, while performing bodily exercises. Additionally, there may be a remote control device or foot controls including a foot pedal (not shown), so that the User can more conveniently change any of the settings or positions or exercise resistance levels of the apparatus, while performing bodily exercises.

As shown in FIG. 2A, the apparatus as configured has two round linear bearing rods, rod 94 and rod 95. These can alternatively be any possible shape or configuration that would fulfill the intended purpose; such as, the rod 94 and rod 95 could be square or rectangular shaped, or shaped as an I-Beam, or any number of other efficacious designs.

As shown in FIG. 3, there is the air pressure gauge 61. It may be desirable to mount additional air pressure gauges (not shown) at various places on the apparatus, which will display the current air pressure in the pneumatic resistance mechanisms; so that the User can directly see an air pressure gauge from various different positions around the apparatus. Additionally, it may be best to include an air pressure gauge that will display not just the actual pounds of air pressure in the pneumatic resistance mechanisms, but also the equivalent amount of pounds of weight resistance force that will be experienced by the User at the exercise bar 31, for different air pressure readings as indicated by the gauge.

For any configuration that includes the manual air pump 66, shown in FIG. 6, the pump 66 may be mounted in a different position (not shown) so that the User's movement of the connecting bars 33 and 34, or the leg extension beam 171, will cause a compression and release of the lever on the pump 66, such that the User will be increasing the air pressure in the pneumatic resistance mechanisms 69 and 70, or in an air holding tank mounted on the apparatus (not shown), while performing repetitions of a physical exercise. Thus, the User would have the option of performing an exercise in which the exercise resistance will be continually increasing, without the need for a human spotter, and without any need for an electrical configuration of this apparatus to accomplish that. Or alternatively, if the pump 66 is set up to inflate an attached air holding tank (not shown), then the User's exercise repetitions will be able to provide all the compressed air needed to power the entire apparatus, without need for the air compressor 64.

For any configuration that includes the pneumatically actuated disc 52 as shown in FIG. 7A, an air holding tank (not shown) may be added to the apparatus, so that some quantity of air can be available to increase the pressure in the resistance mechanisms 69 and 70, and thus increase the exercise resistance to the User, without having to manually operate the pump 66 or run the air compressor 64.

As shown in FIG. 7B and FIG. 9B, one configuration of this apparatus will include an electric resistance mechanism, with voice activated control using the voice recognition module 124 or the mobile device 125. In lieu of or in addition to the voice recognition module 124 or the mobile device 125, there may be a simple control panel (not shown); which would include an on-off switch plus an up-down switch for the drive motor 36 and a knob type dial plus a digital readout, for the User to dial their selection as to what level of exercise resistance they desire for the next exercise movement to be performed. In this case, the resistance level would best be indicated to the User as a digital number.

For any configuration that includes the pneumatically actuated disc 52, the disc 52 may consist of two or more separate pieces rather than to be a one piece disc 52 as shown in FIG. 7A. This would allow for easier replacement of the disc 52 in the future, which may be necessary for applications where the apparatus is in constant daily use. Alternatively, the disc 52 or the hub 51 may include various additional configurations such as a roller bearing disc plate (not shown) or a roller bearing hub (not shown). And, since these types of pneumatic brakes as used in industrial machineries such as bag converting machines, normally are turning at an RPM ranging from fifty to several hundred; and in contrast, in this apparatus the normal RPM while a User is exercising will range from zero to approximately fifteen RPM, it may therefore be best for the OEM disc manufacturers to make the disc with some alternate material that will be better suited to this type of low RPM application.

As shown in FIG. 7C, one embodiment of the apparatus will include the stepper motor 40 and two of the electro magnetic particle brakes 48 and the magneto elastic torque sensor 47 on both sides of the motor 40. Alternatively, the apparatus may be configured with a stepper motor that includes both torque sensing and braking capabilities within the motor, to eliminate the need for the sensors 47 and the brakes 48. Other potential configurations may include the stepper motor 40 combined with two brakes 48 that would include a torque sensing capability within the brakes 48; such that there would not be a need for any additional torque sensor such as the torque sensor 47.

As shown in FIG. 8A, the vertical column 91 may include an articulating power cord (not shown) mounted on the inside of the column 91, to power the electric mechanisms that are featured on various configurations of this apparatus. As the bracket 71 or the bracket 85 moves, the articulating power cord will fold up or unfold within the column 91, to allow the bracket 71 or the bracket 85 to move up and down while maintaining an electric power connection to the electric mechanisms that are mounted on the apparatus.

FIG. 9C shows a different design for the resistance mechanism bracket 71. The resistance mechanism double flange support bracket 85 will be the best design for any configuration of the apparatus that will be used by particularly strong Users. The force applied by a very strong User to the exercise bar 31 and thus to the tension bar 32 and the resistance mechanism double flange bracket 85, could otherwise cause the single flange resistance mechanism bracket 71 to crack. Additionally, the double flange design of the double flange bracket 85 will help to stabilize the tension bar 32 and thus the exercise bar 31, when the apparatus is being operated by Users with high bodily strength, who may otherwise have the ability to cause the tension bar 32 to bend the flange of the bracket 71 and cause the bracket 71 to crack.

As seen in FIG. 10, the vertical screw 131 will be approximately forty eight inches in length. However, it may be appropriate for the vertical screw 131 to be longer in length, such as if this apparatus were configured to be used by a basketball team with athletes having bodily heights of over seven feet. In that case the vertical screw 131 would need to be elongated, as well as the vertical column 91 and the linear bearing rods 94 and 95.

As shown in FIG. 14A, the apparatus is configured to be mounted on a vertical surface. An alternate configuration would include a weather proof housing (not shown) for the resistance mechanism 43 and the bracket 88; so that the apparatus can be utilized in an exterior environment such as along a public running path. Additionally, for installations in public areas, it will be best for the apparatus to include a safety feature so that the air pressure in the resistance mechanism 43 will be released over a short time period. This will cause the exercise bar 31 to fall down to a fully lowered position, preventing any person from walking into the bar 31; which could happen if the bar 31 were to remain in a horizontal position.

Alternatively, the same mounting as shown in FIG. 14A, could be used to mount the apparatus on a ceiling or on a floor, rather than on a vertical wall. The floor or ceiling mount would allow for additional bodily exercises that would be of particular use to athletes such as baseball players, tennis players, swimmers, and Olympic rowers.

As shown in FIG. 16A, the apparatus is configured for use by a bedridden patient. In this configuration with the elongated bars 37 and 38, it may be best for the bars 37 and 38 to be made from some particularly light weight material for ease of use and transport; so long as sufficient rigidity of the bars is maintained.

As shown in FIG. 18A, the apparatus includes the Dead Lift station 123. When performing a Dead Lift or Squat, with a resistance force amount that is greater than the User's bodily weight, the User may be lifted off the floor rather than for the User to pull the bar 31 down, during the down stroke of an exercise repetition. Thus, there could be any variety of attachments for this purpose, including but not limited to: straps to hold the User down to the platform 122, foot stirrups attached to the platform 122, or ankle braces to hold the User to the platform 122. And, an alternate configuration for a User to perform a Dead Lift exercise would include the bench 111 with foot indentations (not shown) below the top level of the bench 111, so that a User can stand at the front of the apparatus to perform exercise movements such as the Dead Lift, with both feet positioned in the foot indentations of the bench 111.

As shown in FIG. 18A, the apparatus as configured includes the torque sensing and positioning resistance mechanism 86. An additional feature in this configuration would be a digital readout (not shown) mounted on the apparatus in a position that can be observed by the User, to provide the User a numeric indication of the amount of force that is being applied by the User to the bar 31, as well as an indication of the amount of resistance force being applied by the apparatus to the User.

As shown in FIG. 18A, the apparatus includes the leg extension station 175. An alternate configuration would include different attachments in place of the station 175; such as a seated bicep curl station (not shown), or a bicycle exercise station (not shown) with two foot pedals for the User to perform a bicycle movement or an arm crank movement, with exercise resistance provided by the resistance mechanism 44.

Conclusion, Ramifications and Scope

In conclusion, and based on the descriptions of the drawings, the configurations and operations, and the alternative configurations as detailed above, the reader can see that at least one embodiment of this exercise apparatus will provide:

A resistance mechanism that is symmetrical as positioned on the apparatus, that applies an exercise resistance force to the User that is substantially the same resistance force in both directions of exercise movement.

A capability for infinite vertical adjustment and positioning of the primary exercise bar that the User is in contact with while performing physical exercises.

A capability for the apparatus to detect the actual force being applied by the User to the apparatus; and then in response, to change the exercise resistance as applied to the User.

A capability for voice recognition, so that the User can speak commands to the apparatus, with the apparatus responding accordingly.

A capability whereby the primary exercise bar that the User is in contact with, can be positioned on the front side or the rear side of the apparatus, to allow for maximum exercise effect for the User; and multiple different bodily exercises.

A capability for the apparatus to calibrate itself against a known quantity of free weights.

A capability to operate in locations where there is no electric power.

A capability to operate in environments where there is zero gravity or low gravity.

A capability to provide at least one hundred pounds of exercise resistance to the User, while maintaining a sound level of no more than thirty decibels from the apparatus.

A capability to be mounted inside a shallow closet or a shallow wall recess, so that the apparatus can be conveniently hidden from view when not in use.

A capability for the maximum exercise force of the apparatus to be accurately matched to the expected needs of the User or average Users; including the capability to provide extraordinarily high amounts of exercise resistance force for exceptionally strong Users.

A capability to provide isometric exercises for a User.

Thus, specific compositions and methods of a multi function exercise apparatus with a resistance mechanism have been disclosed. It should be apparent, however, to those skilled in the art that many more modifications besides those already described are possible without departing from the inventive concepts herein. The inventive subject matter, therefore, is not to be restricted except in the spirit of the disclosure. The invention is applicable to other embodiments or of being practiced or carried out in various ways; and the invention will be limited only by the claims and the equivalents thereof.

Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An exercise apparatus, comprising:
a first bar of sufficient size to accommodate use by a human user for bodily exercise;
a plurality of connecting bars of equal length;
a second bar that is attached to said first bar by said connecting bars and is substantially parallel to said first bar;
said first bar having a total length that is greater than the distance between said connecting bars;
each connecting bar of the plurality of said connecting bars of equal length connected directly to said first bar;
an electric resistance mechanism attached to said second bar, said electric resistance mechanism selected from a group consisting of an electromagnetic clutch, an electromagnetic brake, an electromagnetic particle brake, an electromechanical brake, an electric clutch, an electric brake, an electromagnetic particle clutch, and an electro pneumatic brake;
said electric resistance mechanism positioned substantially symmetrically on said second bar in relation to the ends of said second bar;
said first bar and said plurality of connecting bars of equal length capable of being rotated at least three hundred degrees around the rotational center point of said second bar; and
said electric resistance mechanism capable of providing at least one hundred pounds of exercise resistance to the user.

2. The apparatus of claim 1, wherein:
said electric resistance mechanism is capable of changing the amount of the resistance force applied to the user, in response to the amount of force applied by the user to the apparatus.

3. The apparatus of claim 1, further comprising:
a torque measuring sensor attached to said second bar;
a solid state control device capable of receiving an input from said torque measuring sensor; and
said solid state control device capable of calibrating itself against a known quantity of free weight, such that the resistance force applied to the user by the apparatus will be substantially equal to the resistance that would be experienced by the user if the user were lifting that same poundage of free weights.

4. The apparatus of claim 1, further comprising:
a stepper motor attached to said second bar; and
said stepper motor capable of rotating said second bar, to change the position of said first bar and said set of connecting bars of equal length in relation to said second bar, to allow the user an additional exercise position.

5. The apparatus of claim 1, wherein:
said electric resistance mechanism is capable of changing the amount of the resistance force applied to the user, in response to the speed at which the user is moving said first bar.

6. The apparatus of claim 1, further comprising:
a voice recognition module directly attached to the apparatus;
said voice recognition module capable of receiving and recognizing verbal commands from the user;
said voice recognition module capable of converting said verbal commands into a signal;
a control device capable of receiving said signals from said voice recognition module;
said electronic resistance mechanism capable of receiving said signal from said control device; and
said electric resistance mechanism capable of changing the resistance force applied by the apparatus to the user in response to said signal.

7. The apparatus of claim 6, wherein:
the voice recognition module is a mobile device; and
the apparatus includes a receptacle designed to hold said mobile device so that said mobile device will be directly attached to the apparatus.

8. The apparatus of claim 1, further comprising:
a bracket attached to said electric resistance mechanism; and
said bracket having sufficient strength such that the assembly of said electric resistance mechanism and said first bar and said second bar and said connecting bars of equal length and said bracket can be attached to a stationary object, and remain attached while bodily exercises are performed.

9. The apparatus of claim 8, further comprising:
a vertical screw mechanism attached to said bracket;
a drive motor attached to said vertical column; and
said drive motor capable of turning said vertical screw mechanism in a clockwise or counterclockwise motion.

10. The apparatus of claim 9, further comprising:
a base with wheels sufficient for the apparatus to be moved from location to location;
said base having sufficient weight such that the apparatus will remain in a substantially upright position while being moved from location to location in an interior or exterior environment; and
said plurality of connecting bars of equal length having sufficient length so that a user lying prone in a bed with the user's feet closest to the base of the bed can perform upper body exercises in contact with said first bar, while the apparatus is positioned at the base of the bed that the use is lying prone in.

11. The apparatus of claim 9, further comprising:
an attached bench of sufficient size for a user to sit or lie prone upon while performing physical exercises; and
an additional resistance mechanism attached to said bench.

12. The apparatus of claim 9, wherein:
said drive motor is a stepper motor; and
said stepper motor is capable of moving said second bar in relation to said vertical screw mechanism, to allow the user an additional exercise position.

13. An exercise apparatus, comprising:
a first bar of sufficient size to accommodate use by a human user for bodily exercise;
a plurality of connecting bars of equal length;
a second bar that is attached to said first bar by said connecting bars and is substantially parallel to said first bar;
said first bar having a total length that is greater than the distance between said connecting bars;

each connecting bar of the plurality of said connecting bars of equal length connected directly to said first bar;

an electric resistance mechanism attached to said second bar, said electric resistance mechanism selected from a group consisting of an electromagnetic clutch, an electromagnetic brake, an electromagnetic particle brake, an electromechanical brake, an electric clutch, an electric brake, an electromagnetic particle clutch, and an electro pneumatic brake;

said electric resistance mechanism positioned substantially symmetrically on said second bar in relation to the ends of said second bar;

said first bar and said plurality of connecting bars of equal length capable of being rotated at least three hundred degrees around the rotational center point of said second bar; said electric resistance mechanism capable of providing at least one hundred pounds of exercise resistance to the user;

a voice recognition module directly attached to the apparatus;

said voice recognition module capable of receiving and recognizing verbal commands from the user;

said verbal commands recognized by said voice recognition module to include the word "up" and the word "down" and the word "five" and the word "ten";

said voice recognition module capable of converting said verbal commands into a signal;

a control device capable of receiving said signals from said voice recognition module;

said electric resistance mechanism capable of receiving said signal from said control device;

said electric resistance mechanism capable of changing the resistance force provided by the apparatus to the user in response to said signal;

said electric resistance mechanism capable of changing the resistance force provided by the apparatus to the user by specific amounts in increasing and decreasing increments; and said increasing or decreasing incremental changes to the resistance force provided by the apparatus to the user including an additional five pounds, an additional ten pounds, a decrease of five pounds, or a decrease of ten pounds, respectively, in response to the verbal commands "up five," "up ten," "down five," or "down ten".

* * * * *